United States Patent
Usami et al.

(10) Patent No.: US 10,040,035 B2
(45) Date of Patent: Aug. 7, 2018

(54) GAS SEPARATION MEMBRANE, GAS SEPARATION MODULE, GAS SEPARATION DEVICE, AND GAS SEPARATION METHOD

(71) Applicant: FUJIFILM Corporation, Tokyo (JP)

(72) Inventors: Ryota Usami, Ashigarakami-gun (JP); Koji Hironaka, Ashigarakami-gun (JP); Satoshi Sano, Ashigarakami-gun (JP); Takeshi Narita, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/074,790

(22) Filed: Mar. 18, 2016

(65) Prior Publication Data

US 2016/0199790 A1    Jul. 14, 2016

Related U.S. Application Data

(63) Continuation of application No. PCT/JP2014/074560, filed on Sep. 17, 2014.

(30) Foreign Application Priority Data

Sep. 20, 2013 (JP) .................. 2013-195595
Feb. 27, 2014 (JP) .................. 2014-037566

(51) Int. Cl.
*B01D 71/64* (2006.01)
*B01D 53/22* (2006.01)
(Continued)

(52) U.S. Cl.
CPC .......... *B01D 71/64* (2013.01); *B01D 53/228* (2013.01); *B01D 69/12* (2013.01); *C08G 73/10* (2013.01);
(Continued)

(58) Field of Classification Search
CPC ...... B01D 53/228; B01D 69/12; B01D 71/64; B01D 2257/504; C08G 73/1067
See application file for complete search history.

(56) References Cited

U.S. PATENT DOCUMENTS

RE30,351 E * 7/1980 Hoehn .................. B01D 71/64
                                             210/500.38
4,717,393 A * 1/1988 Hayes .................. B01D 71/64
                                             210/500.39
(Continued)

FOREIGN PATENT DOCUMENTS

JP    3-89929 A    2/1991
JP    3-89929 A    4/1991
(Continued)

OTHER PUBLICATIONS

International Search Report for PCT/JP2014/074560 dated Nov. 11, 2014.
(Continued)

*Primary Examiner* — Jason M Greene
(74) *Attorney, Agent, or Firm* — Birch, Stewart, Kolasch & Birch, LLP

(57) ABSTRACT

Provided are a gas separation membrane which includes a gas separation layer formed to include a polyimide com-
(Continued)

pound and in which the polyimide compound includes a repeating unit represented by the following Formula (I), a gas separation module, a gas separation device, and a gas separation method using the same.

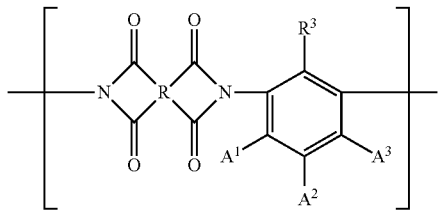

Formula (I)

In Formula (I), R represents a group having a specific structure. $R^3$ represents a specific substituent group. $A^1$ to $A^3$ represent a hydrogen atom or a specific substituent group, but all of $A^1$ to $A^3$ do not represent a hydrogen atom at the same time.
In this case, at least one of $R^3$, $A^1$, $A^2$, and $A^3$ represents a specific polar group.

19 Claims, 1 Drawing Sheet

(51) Int. Cl.
    *B01D 69/12*     (2006.01)
    *C08G 73/10*     (2006.01)
(52) U.S. Cl.
    CPC .. *B01D 2256/245* (2013.01); *B01D 2257/504* (2013.01); *Y02C 10/10* (2013.01)

(56) References Cited

U.S. PATENT DOCUMENTS

| | | | | |
|---|---|---|---|---|
| 4,880,442 A * | 11/1989 | Hayes | ............... | B01D 71/64 95/51 |
| 5,076,816 A | 12/1991 | Avrillon et al. | | |
| 5,112,941 A * | 5/1992 | Kasai | ............... | B01D 71/64 528/128 |
| 5,145,940 A | 9/1992 | Wernet et al. | | |
| 5,618,334 A * | 4/1997 | Ozcayir | ............... | B01D 71/64 210/500.39 |
| 5,716,430 A * | 2/1998 | Simmons | ............... | B01D 71/64 210/500.39 |
| 5,817,165 A | 10/1998 | Hachisuka et al. | | |
| 5,928,410 A * | 7/1999 | Jois | ............... | B01D 53/228 55/DIG. 5 |
| 7,247,191 B2 | 7/2007 | Koros et al. | | |
| 2004/0107830 A1 * | 6/2004 | Simmons | ............... | B01D 71/64 95/45 |
| 2004/0177753 A1 * | 9/2004 | Chung | ............... | B01D 53/228 95/43 |
| 2011/0094379 A1 * | 4/2011 | Cordatos | ............... | B01D 53/228 95/51 |
| 2011/0269915 A1 * | 11/2011 | Koros | ............... | B01D 71/64 525/420 |
| 2012/0323059 A1 * | 12/2012 | Liu | ............... | B01D 71/64 585/818 |
| 2014/0026756 A1 * | 1/2014 | Guo | ............... | B01D 71/64 96/10 |
| 2014/0130667 A1 | 5/2014 | Sano et al. | | |
| 2014/0345457 A1 * | 11/2014 | Balster | ............... | B01D 71/64 95/53 |

FOREIGN PATENT DOCUMENTS

| | | |
|---|---|---|
| JP | 3-121132 A | 5/1991 |
| JP | 6-87957 A | 3/1994 |
| JP | 9-898 A | 1/1997 |
| JP | 10-168188 A | 6/1998 |
| JP | 2000-288371 A | 10/2000 |
| JP | 2007-297605 A | 11/2007 |
| JP | 2009-72781 A | 4/2009 |
| JP | 2013-46904 A | 3/2013 |
| WO | WO 2012/166153 A1 | 12/2012 |

OTHER PUBLICATIONS

Kim et al., "$CO_2$ separation performances of composite membranes of 6FDA-based polyimides with a polar group", Journal of Membrane Science 211 (2003), pp. 41-49.
Written Opinion of the International Searching Authority for PCT/JP2014/074560 (PCT/ISA/237) dated Nov. 11, 2014.

* cited by examiner

GAS SEPARATION MEMBRANE, GAS SEPARATION MODULE, GAS SEPARATION DEVICE, AND GAS SEPARATION METHOD

CROSS-REFERENCE TO RELATED APPLICATIONS

This application is a Continuation of PCT International Application No. PCT/JP2014/074560 filed on Sep. 17, 2014, which claims priority under 35 U.S.C. § 119 (a) to Japanese Patent Application No. 2013-195595 filed on Sep. 20, 2013, and to Japanese Patent Application No. 2014-37566 filed on Feb. 27, 2014. Each of the above applications is hereby expressly incorporated by reference, in its entirety, into the present application.

BACKGROUND OF THE INVENTION

1. Field of the Invention

The present invention relates to a gas separation membrane, a gas separation module, a gas separation device, and a gas separation method.

2. Description of the Related Art

A material formed of a polymer compound has gas permeability specific to the material. Based on this property, it is possible to cause selective permeation and separation out of a target gas component using a membrane formed of a specific polymer compound. As an industrial use aspect for this gas separation membrane related to the problem of global warming, separation and recovery from large-scale carbon dioxide sources with this gas separation membrane has been examined in thermal power plants, cement plants, or ironworks blast furnaces. Further, this membrane separation technique has been attracting attention as a means for solving environmental issues which can be achieved with relatively little energy. In addition, natural gas or biogas (from biological excrement, organic fertilizers, biodegradable substances, sewage, garbage, fermented energy crops, or gas generated due to anaerobic digestion) is mixed gas mainly containing methane and carbon dioxide, and a membrane separation method is being examined as a means for removing impurities such as the carbon dioxide and the like (JP2007-297605A).

When natural gas is purified using the membrane separation method, excellent gas permeability and separation selectivity are required in order to efficiently perform separation of gas. Various membrane materials have been examined in order to realize excellent gas permeability and separation selectivity, and a gas separation membrane using a polyimide compound has been examined as a means therefor. For example, Journal of Membrane Science (2003, 211, pp. 41 to 49) discloses that separation selectivity of a gas separation membrane is improved when a polyimide compound to which a polar group such as a carboxy group or a hydroxyl group is introduced is used.

Moreover, in an actual plant, a membrane is plasticized due to a high pressure condition and impurities (for example, benzene, toluene, and xylene) present in natural gas and this leads to a degradation of separation selectivity, which is problematic. In order to suppress the plasticizing of the membrane, it is known that introduction of a crosslinking structure or a branched structure to a polymer compound constituting the membrane is effective. U.S. Pat. No. 7,247,191B describes a polyimide cross-linked membrane in which a polyimide compound including a carboxyl group is mono-esterified using a diol compound and which allows remaining hydroxyl groups of this diol compound to form a crosslinking structure.

In order to obtain a practical gas separation membrane, it is necessary to ensure sufficient gas permeability by making a gas separation layer thinner and sufficient gas separation selectivity. A method of making a portion contributing to separation into a thin layer referred to as a dense layer or a skin layer by forming a polymer compound such as a polyimide compound into an asymmetric membrane using a phase separation method is known as a technique of forming a gas separation layer into a thin layer. In this asymmetric membrane, a portion other than a dense layer is allowed to function as a support layer responsible for mechanical strength of a membrane.

Further, in addition to the asymmetric membrane, a form of a composite membrane in which a substance responsible for a gas separation function is different from a substance responsible for mechanical strength is also known.

SUMMARY OF THE INVENTION

The gas separation membrane described in Journal of Membrane Science (2003, 211, pp. 41 to 49) is configured of a polyimide compound obtained by polymerizing 6FDA (4,4'-(hexafluoroisopropylidene)diphthalic dianhydride) as a tetracarboxylic dianhydride and DABA (3,5-diaminobenzoic acid) having a carboxy group as a diamine. However, in the gas separation membrane, the performance is likely to be degraded under a high pressure condition. Further, resistance to impurities is not sufficient. In addition, the gas separation membrane is plasticized when exposed to toluene or the like and thus the gas separation performance is likely to be degraded.

Moreover, in the gas separation membrane described in U.S. Pat. No. 7,247,191B, the polyimide compound is cross-linked to form a separation membrane. Accordingly, degradation of performance under a high pressure condition or resistance to impurities are somewhat improved, but the permeability to carbon dioxide is sacrificed.

Further, gas permeability and gas separation selectivity are typically in a trade-off relationship. Therefore, the gas permeability or the gas separation selectivity of a gas separation layer formed of a polyimide compound can be controlled by adjusting copolymerization components. However, it is difficult to obtain both of these characteristics at a high level.

An object of the present invention is to provide a gas separation membrane which achieves both of excellent gas permeability and gas separation selectivity and has a gas separation layer that is unlikely to be affected by the high pressure condition or impurities present in natural gas. Further, another object of the present invention is to provide a gas separation module, a gas separation device, and a gas separation method using the above-described gas separation membrane.

The present inventors conducted intensive research to solve the above-described problems. As a result, the present inventors found that a gas separation membrane which achieves both of excellent gas permeability and gas separation selectivity under a high pressure condition and shows high resistance to impurities such as toluene and the like can be obtained by employing a 1,3-phenylenediamine skeleton having substituents in the site of a 2-position and at least one site from among 4- to 6-positions as diamine components of a polyimide compound constituting a gas separation membrane and using a substituent at the 2-position of these diamine components as a specific polar group, at least one substituent from among substituents at the 4- to 6-positions as a specific polar group, or the substituent at the 2-position and at least one substituent from among substituents at the 4- to 6-positions as specific polar groups. The present invention has been realized based on this knowledge.

According to the present invention, the following means is provided.

<1> A gas separation membrane including: a gas separation layer which is formed to include a polyimide compound, in which the polyimide compound includes a repeating unit represented by the following Formula (I).

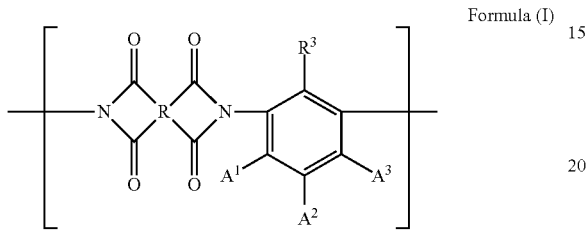

Formula (I)

In Formula (I), R represents a group having a structure represented by any of the following Formulae (I-1) to (I-28). $X^1$ to $X^3$ represent a single bond or a divalent linking group, L represents —CH=CH— or —CH$_2$—, $R^1$ and $R^2$ represent a hydrogen atom or a substituent group, and the symbol "*" represents a binding site with respect to a carbonyl group in Formula (I).

$R^3$ represents a group selected from a group consisting of an alkyl group, a halogen atom, a carboxy group, a hydroxyl group, an alkylamino group, an arylamino group, an acylamino group, an alkoxy group, an acyloxy group, an alkoxycarbonyl group, an imidazole group, a triazole group, a tetrazole group, a cyano group, a sulfo group, a sulfonamide group, an alkylsulfonyl group, and a mercapto group.

$A^1$ to $A^3$ represent a hydrogen atom or a group selected from a group consisting of an alkyl group, a halogen atom, a carboxy group, a hydroxyl group, an alkylamino group, an arylamino group, an acylamino group, an alkoxy group, an acyloxy group, an alkoxycarbonyl group, an imidazole group, a triazole group, a tetrazole group, a cyano group, a sulfonamide group, an alkylsulfonyl group, and a mercapto group, but all of $A^1$ to $A^3$ do not represent a hydrogen atom at the same time.

In this case, at least one of $R^3$, $A^1$, $A^2$, and $A^3$ represents a group selected from a group consisting of a carboxy group, a hydroxyl group, an alkylamino group, an acylamino group, an alkoxy group, an acyloxy group, an alkoxycarbonyl group, an imidazole group, a triazole group, a tetrazole group, a cyano group, a sulfonamide group, an alkylsulfonyl group, and a mercapto group.

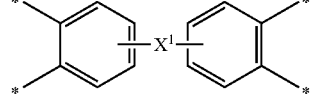

(I-1)

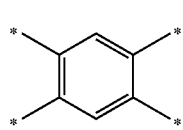

(I-2)

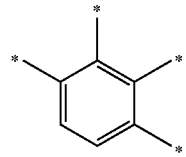

(I-3)

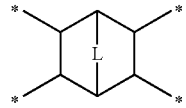

(I-4)

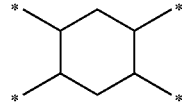

(I-5)

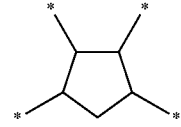

(I-6)

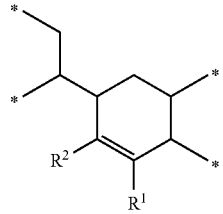

(I-7)

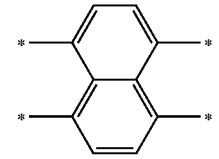

(I-8)

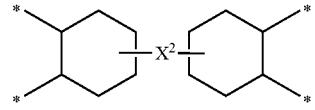

(I-9)

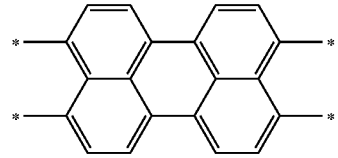

(I-10)

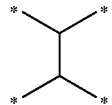

(I-11)

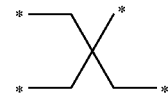

(I-12)

-continued

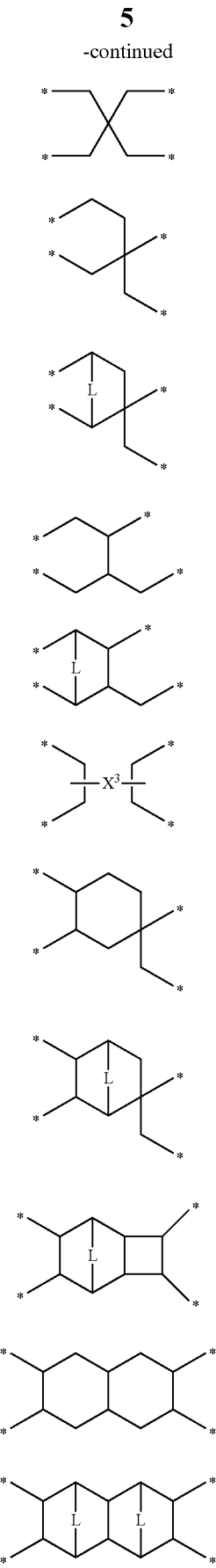

(I-13)
(I-14)
(I-15)
(I-16)
(I-17)
(I-18)
(I-19)
(I-20)
(I-21)
(I-22)
(I-23)

-continued

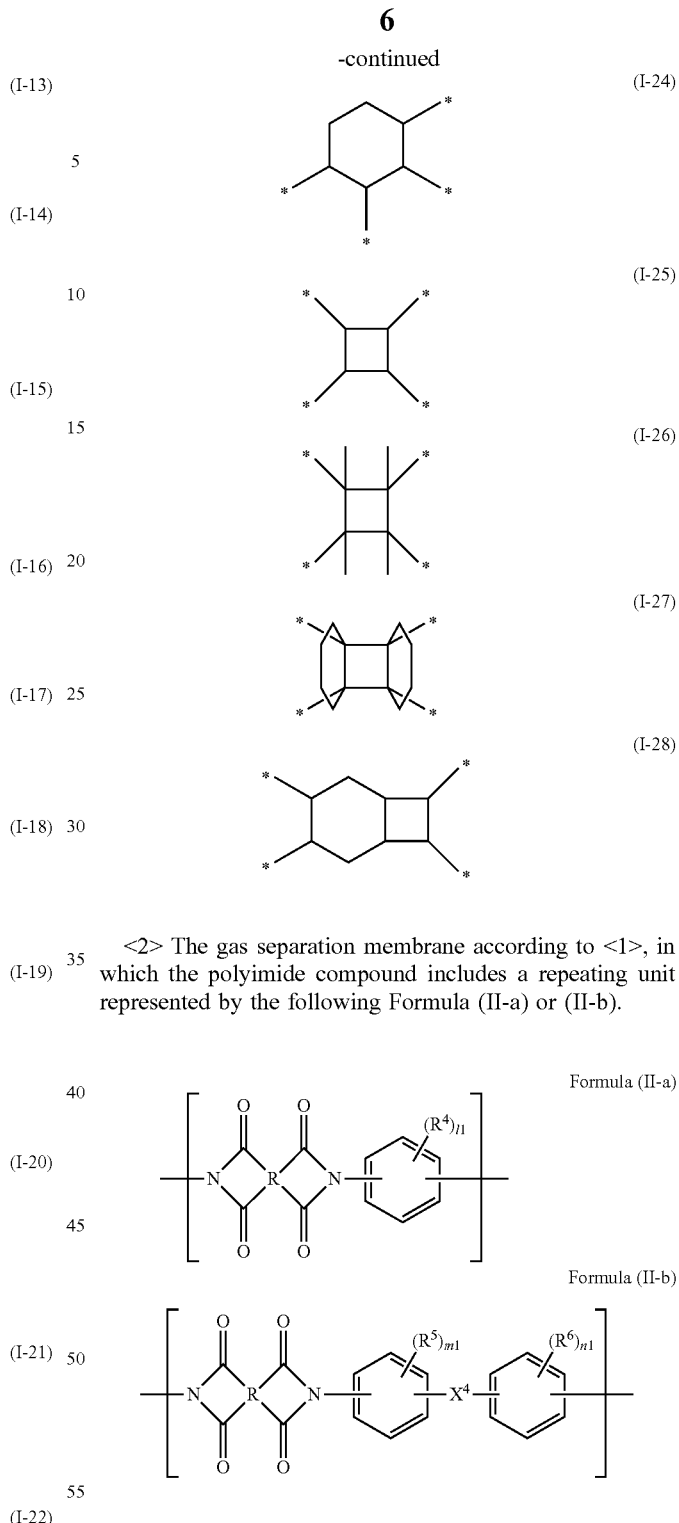

(I-24)
(I-25)
(I-26)
(I-27)
(I-28)

<2> The gas separation membrane according to <1>, in which the polyimide compound includes a repeating unit represented by the following Formula (II-a) or (II-b).

In Formulae (II-a) and (II-b), R has the same definition as that for R in Formula (I). $R^4$ to $R^6$ represent a substituent group. l1, m1, and n1 represent an integer of 0 to 4. $X^4$ represents a single bond or a divalent linking group.

<3> The gas separation membrane according to <1> or <2>, in which the gas separation membrane is a composite gas separation membrane which includes the gas separation layer on the upper side of a support layer having gas permeability.

<4> The gas separation membrane according to <3>, in which the support layer is formed of a porous layer on a gas separation layer side and a non-woven fabric layer on a side opposite to the gas separation layer.

<5> The gas separation membrane according to any one of <1> to <4>, in which, in a case where gas subjected to a separation treatment is mixed gas of carbon dioxide and methane, the permeation rate of carbon dioxide at 40° C. and 5 MPa is greater than 20 GPU, and the ratio between permeation rates of carbon dioxide and methane ($R_{CO2}/R_{CH4}$) is 15 or greater.

<6> The gas separation membrane according to any one of <1> to <5>, in which the molecular weight cut-off of the porous layer is 100000 or less.

<7> The gas separation membrane according to any one of <1> to <6>, which is used to allow selective permeation of carbon dioxide from gas containing carbon dioxide and methane.

<8> A gas separation module including the gas separation membrane according to any one of <1> to <7>.

<9> A gas separation device including the gas separation module according to <8>.

<10> A gas separation method including: allowing carbon dioxide to selectively permeate from gas containing carbon dioxide and methane using the gas separation membrane according to any one of <1> to <6>.

In the present specification, when a plurality of substituent groups or linking groups (hereinafter, referred to as substituent groups or the like) shown by specific symbols are present or a plurality of substituent groups are defined simultaneously or alternatively, this means that the respective substituent groups may be the same as or different from each other. The same applies to the definition of the number of substituent groups or the like. Moreover, in a case where there is a repetition of a plurality of partial structures shown by means of the same display in the formula, the respective partial structures or repeating units may be the same as or different from each other. In addition, even in a case where not specifically stated, when a plurality of substituent groups or the like are adjacent to each other, it means that they may be condensed or linked to each other and form a ring.

In regard to compounds (including resins) described in the present specification, the description includes salts thereof and ions thereof in addition to the compounds. Further, the description includes derivatives formed by changing a part of the structure within the range in which target effects are exhibited.

A substituent group (the same applies to a linking group) in which substitution or non-substitution is not specified in the present specification may include an optional substituent group of the group within the range in which target effects are exhibited. The same applies to a compound in which substitution or non-substitution is not specified.

A preferable range of a group Z of substituent groups described below is set as a preferable range of a substituent group in the present specification unless otherwise specified.

The gas separation membrane, the gas separation module, and the gas separation device of the present invention have excellent gas permeability and high gas separation performance. In addition, when the gas separation membrane, the gas separation module, and the gas separation device are used under a high pressure condition or used for separation of gas containing impurities and the like such as toluene, the gas separation performance is unlikely to be degraded.

According to the gas separation method of the present invention, it is possible to separate gas with higher permeability and higher selectivity. In addition, even when gas is separated in a high pressure condition or impurities are present in the gas, high gas separation performance is maintained.

The above-described and other features and the above-described and other advantages of the present invention will become apparent with reference to the description below and the accompanying drawings.

DESCRIPTION OF THE PREFERRED EMBODIMENTS

Figure 1:
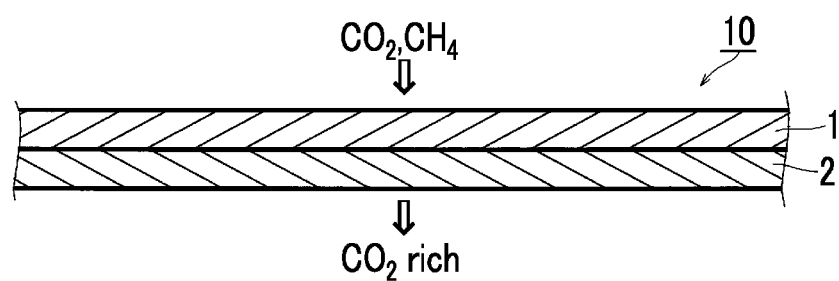
FIG. 1 is a sectional view schematically illustrating an embodiment of a composite gas separation membrane of the present invention.

Hereinafter, the present invention will be described in detail.

In a gas separation membrane of the present invention, a gas separation layer includes a specific polyimide compound.

[Polyimide Compound]

The polyimide compound used in the present invention includes at least a repeating unit represented by the following Formula (I).

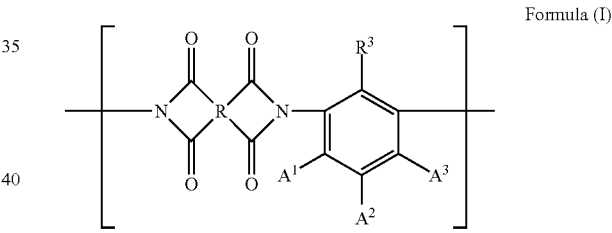

Formula (I)

In Formula (I), R represents a group having a structure represented by any of the following Formulae (I-1) to (I-28). In the following Formulae (I-1) to (I-28), the symbol "*" represents a binding site with respect to a carbonyl group of Formula (I). R in Formula (I) is referred to as a mother nucleus in some cases, and the mother nucleus R is preferably a group represented by Formulae (I-1), (I-2), or (I-4), more preferably a group represented by Formula (I-1) or (I-4), and particularly preferably a group represented by Formula (I-1).

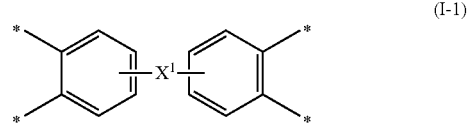

(I-1)

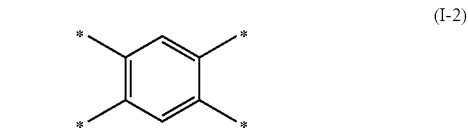

(I-2)

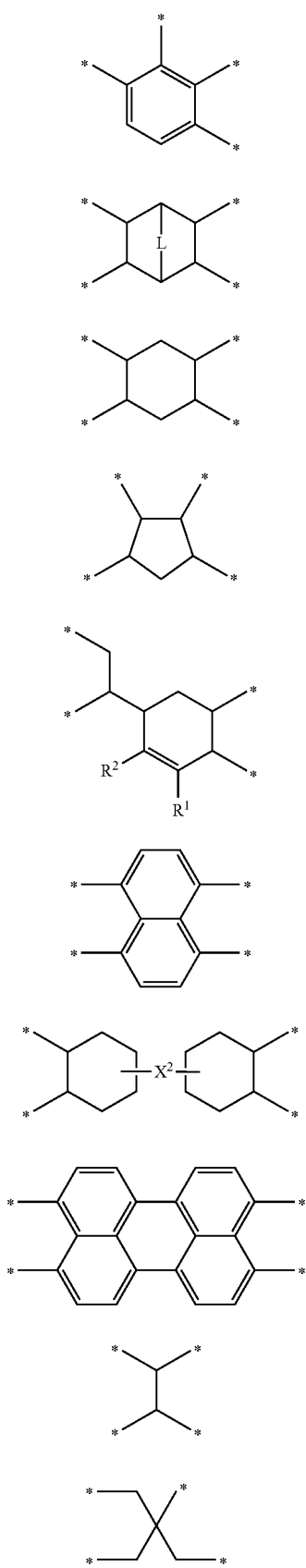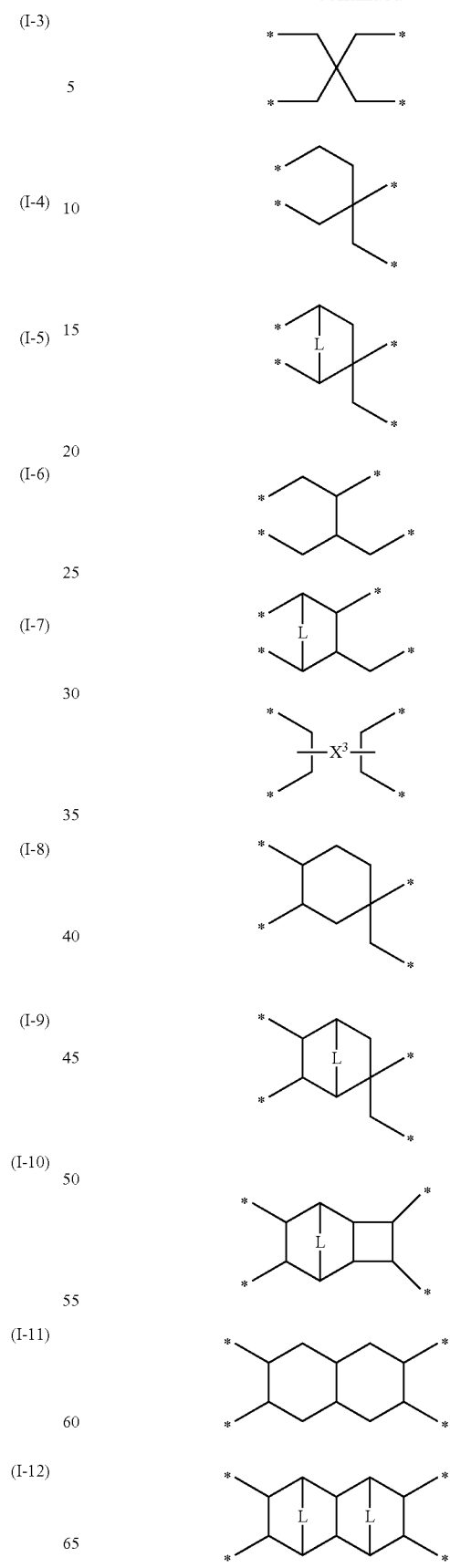

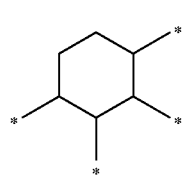 (I-24)

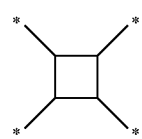 (I-25)

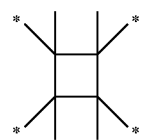 (I-26)

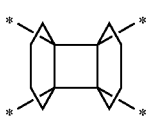 (I-27)

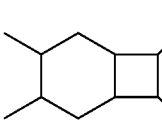 (I-28)

In Formulae (I-1), (I-9), and (I-18), $X^1$ to $X^3$ represent a single bond or a divalent linking group. As the divalent linking group, —C($R^x$)$_2$— ($R^x$ represents a hydrogen atom or a substituent group. In a case where $R^x$ represents a substituent group, $R^x$'s may be linked to each other and form a ring), —O—, —SO$_2$—, —C(=O)—, —S—, —NR$^Y$— ($R^Y$ represents a hydrogen atom, an alkyl group (preferably a methyl group or an ethyl group), an aryl group (preferably a phenyl group)), —C$_6$H$_4$— (phenylene group), or a combination of these is preferable and a single bond or —C($R^x$)$_2$— is more preferable. When $R^x$ represents a substituent group, a group Z of substituent groups described below is specifically exemplified. Among these, an alkyl group (the preferable range is the same as that of the alkyl group in the group Z of substituent groups described below) is preferable, an alkyl group having a halogen atom as a substituent group is more preferable, and trifluoromethyl is particularly preferable. Further, in regard to the expression "may be linked to each other and form a ring" in the present specification, the linkage may be made by a single bond or a double bond and a cyclic structure may be formed or condensation may be made and a condensed ring structure may be formed. Moreover, in Formula (I-18), $X^3$ is linked to any one of two carbon atoms shown on the left side in the formula and linked to any one of two carbon atoms shown on the right side in the formula.

In Formulae (I-4), (I-15), (I-17), (I-20), (I-21), and (I-23), L represents —CH=CH— or —CH$_2$—.

In Formula (I-7), $R^1$ and $R^2$ represent a hydrogen atom or a substituent group. Examples of the substituent group include groups shown as examples of the group Z of substituent groups described below. $R^1$ and $R^2$ may be bonded to each other and form a ring.

$R^1$ and $R^2$ preferably represent a hydrogen atom or an alkyl group, more preferably represent a hydrogen atom, a methyl group, or an ethyl group, and still more preferably represent a hydrogen atom.

The carbon atoms shown in Formulae (I-1) to (I-28) may further have substituent groups. Specific examples of the substituent groups are the same as the group Z of substituent groups described below. Among these, an alkyl group or an aryl group is preferable.

In Formula (I), $R^3$ may preferably have an alkyl group (the number of carbon atoms of the alkyl group is preferably in a range of 1 to 20, more preferably in a range of 1 to 10, and still more preferably in a range of 1 to 5, the alkyl group may include a heteroatom (preferably an oxygen atom or a sulfur atom) in a chain thereof, and preferred examples thereof include a methyl group, an ethyl group, a n-propyl group, an iso-propyl group, a tert-butyl group, and a trifluoromethyl group); a halogen atom (examples thereof include a bromine atom, a chlorine atom, an iodine atom, and a fluorine atom, and a bromine atom or a chlorine atom is more preferable); a carboxy group; a hydroxyl group; an alkylamino group (a dialkylamino group is included, the same applies hereinafter, the number of carbon atoms thereof is preferably in a range of 1 to 20 and more preferably in a range of 1 to 10, among these, a dialkylamino group having preferably 2 to 20 carbon atoms and more preferably 2 to 10 carbon atoms is preferable, an alkyl group of an alkylamino group may have a heteroatom (preferably an oxygen atom or a sulfur atom) in the chain thereof, further, two alkyl groups of the dialkylamino group may be linked to each other and form a ring, and preferred examples thereof include a methylamino group, a dimethylamino group, an ethylamino group, a diethylamino group, and a morpholino group); an arylamino group (an arylamino group or a diarylamino group having preferably 6 to 18 carbon atoms, more preferably 6 to 15 carbon atoms, and still more preferably 6 to 12 carbon atoms is preferable, and preferred examples thereof include a phenylamino group and a diphenylamino group); an acylamino group (an acylamino group or a diacylamino group having preferably 2 to 20 carbon atoms, more preferably 2 to 15 carbon atoms, and still more preferably 2 to 10 carbon atoms is preferable, and preferred examples thereof include an acetylamino group, a diacetylamino group, and a pivaloylamino group); an alkoxy group (the number of carbon atoms thereof is preferably in a range of 1 to 20, more preferably in a range of 1 to 10, and still more preferably in a range of 1 to 5, and preferred examples thereof include a methoxy group, an ethoxy group, a propoxy group, and a butoxy group); an acyloxy group (the number of carbon atoms thereof is preferably in a range of 2 to 15, more preferably in a range of 2 to 10, and still more preferably in a range of 2 to 5, and preferred examples thereof include an acetyloxy group and a pivaloyloxy group); an alkoxycarbonyl group (the number of carbon atoms thereof is preferably in a range of 2 to 15, more preferably in a range of 2 to 10, and still more preferably in a range of 2 to 5, and preferred examples thereof include a methoxycarbonyl group and an ethoxycarbonyl group); an imidazole group; a triazole group; a tetrazole group; a cyano group; a sulfo group; a sulfonamide group; an alkylsulfonyl group (the number of carbon atoms thereof is preferably in a range of 1 to 15, more preferably in a range of 1 to 10, and still more preferably in a range of 1 to 5, and preferred examples thereof include a methylsulfonyl group and an ethylsulfonyl group); and a mercapto group.

$R^3$ more preferably represents the above-described alkyl group, halogen atom, hydroxy group, carboxy group, alkoxy group, alkylamino group, alkoxycarbonyl group, or acylamino group and still more preferably represents the alkyl group, halogen atom, alkoxy group, or acylamino group.

In Formula (I), $A^1$ to $A^3$ represent a hydrogen atom or a group selected from a group consisting of an alkyl group, a halogen atom, a carboxy group, a hydroxy group, an alkylamino group, an arylamino group, an acylamino group, an alkoxy group, an acyloxy group, an alkoxycarbonyl group, an imidazole group, a triazole group, a tetrazole group, a cyano group, a sulfonamide group, an alkylsulfonyl group, and a mercapto group. In this case, all of $A^1$ to $A^3$ do not represent a hydrogen atom at the same time.

Moreover, it is preferable that all of $A^1$ to $A^3$ are not substituent groups and more preferable that one or two of $A^1$ to $A^3$ are substituent groups. Among these, the form in which $A^2$ represents a substituent group and $A^1$ and $A^3$ represent a hydrogen atom or the form in which $A^1$ (or $A^3$) and $A^2$ represent a substituent group and $A^3$ (or $A^1$) represents a hydrogen atom is preferable.

In $A^1$ to $A^3$, the preferable forms of the alkyl group, the halogen atom, the alkylamino group, the arylamino group, the acylamino group, the alkoxy group, the acyloxy group, the alkoxycarbonyl group, and the alkylsulfonyl group are respectively the same as the preferable forms of the alkyl group, the halogen atom, the alkylamino group, the arylamino group, the acylamino group, the alkoxy group, the acyloxy group, the alkoxycarbonyl group, and the alkylsulfonyl group in the description for $R^3$.

In Formula (I), at least one (preferably one or two) of $R^3$, $A^1$, $A^2$, and $A^3$ represents a polar group selected from the group consisting of a carboxy group, a hydroxy group, an alkylamino group, an acylamino group, an alkoxy group, an acyloxy group, an alkoxycarbonyl group, an imidazole group, a triazole group, a tetrazole group, a cyano group, a sulfonamide group, an alkylsulfonyl group, and a mercapto group. It is more preferable that at least one of $R^3$, $A^1$, $A^2$, and $A^3$ represents a carboxy group, a hydroxy group, an alkylamino group (including a morpholino group), an alkoxy group, an acyloxy group, an alkoxycarbonyl group, or an acylamino group and still more preferable that at least one of $R^3$, $A^1$, $A^2$, and $A^3$ represents a carboxy group, a hydroxy group, an alkoxy group, an acylamino group, or an alkoxycarbonyl group.

In a case where two or more of $R^3$, $A^1$, $A^2$, and $A^3$ represent the above-described polar group, these two or more polar groups may be the same as or different from each other.

Both of gas permeability and gas separation performance of a gas separation membrane can be improved by using a polyimide compound including a repeating unit represented by Formula (I) for the gas separation membrane. The reason therefor is not clear, but it is estimated that the flatness and packing properties of a polymer are moderately suppressed and the gas permeability of the gas separation membrane is improved when the polymer is used for the membrane by the repeating unit, represented by Formula (I), having $R^3$ and the polymer is moderately densified and the gas separation selection performance of the gas separation membrane is further improved when the polymer is used for the membrane by the repeating unit, represented by Formula (I), having a specific polymer group as at least one of $R^3$ and $A^1$ to $A^3$.

Further, pressure resistance, impurity resistance, and plasticization resistance of the membrane can be improved when the molecular motion of the polyimide compound is suppressed due to the presence of $R^3$ and the polymer is used for the gas separation membrane.

It is obvious that a terminal group of a polyimide compound including a repeating unit represented by Formula (I), (II-a), or (II-b) used in the present invention is determined by a synthesis method and reaction raw materials described below. For example, the terminal group is a hydrogen atom, a carboxy group, or an amino group. Further, the terminal group may be substituted by performing capping. In this case, examples of the terminal group include an aryl group and a heteroaryl group.

The polyimide compound used in the present invention may include a repeating unit represented by the following Formula (II-a) or (II-b) in addition to a repeating unit represented by the following Formula (I).

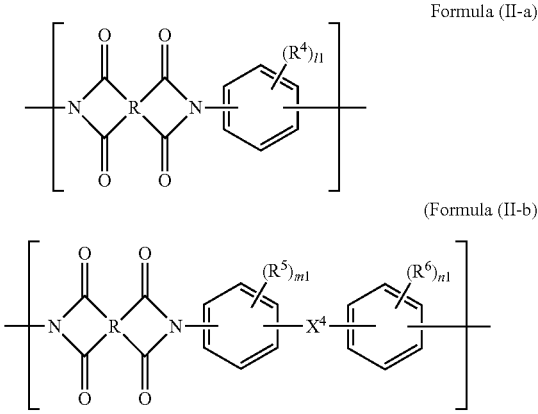

In Formulae (II-a) and (II-b), R has the same definition as that for R in Formula (I) and the preferable range is the same as that of R in Formula (I). $R^4$ to $R^6$ represent a substituent group. Examples of the substituent group are the same as the examples of the group Z of substituent groups described below.

It is preferable that $R^4$ represents an alkyl group or a halogen atom. l1 showing the number of $R^4$'s represents an integer of 0 to 4, preferably an integer of 1 to 4, more preferably an integer of 2 to 4, and still more preferably 3 or 4. In a case where $R^4$ represents alkyl, the number of carbon atoms of the alkyl group is preferably in a range of 1 to 10, more preferably in a range of 1 to 5, and still more preferably in a range of 1 to 3. Even still more preferably, $R^4$ represents methyl, ethyl, or trifluoromethyl.

In Formula (II-a), it is preferable that two binding sites used for incorporation of a diamine component (that is, a phenylene group which may include $R^4$) into a polyimide compound are positioned at the para-position.

In the present invention, the structure represented by Formula (I) is not included in the structure represented by Formula (II-a).

It is preferable that $R^5$ and $R^6$ represent an alkyl group, a halogen atom, or a group that forms a ring together with $X^4$ by $R^5$ and $R^6$ being linked to each other. Further, the form in which two $R^5$'s are linked to each other and form a ring or the form in which two $R^6$'s are linked to each other and form a ring is preferable. The structure formed by $R^5$ and $R^6$ being linked to each other is not particularly limited, but a single bond, —O—, —S— is preferable. m1 and n1 respectively showing the numbers of $R^5$'s and $R^6$'s represent an integer of 0 to 4, preferably an integer of 1 to 4, more preferably an integer of 2 to 4, and still more preferably 3 or 4. In a case where $R^5$ and $R^6$ represent an alkyl group, the number of carbon atoms of the alkyl group is preferably in a range of 1 to 10, more preferably in a range of 1 to 5, and still more preferably in a range of 1 to 3. Even still more preferably, $R^5$ and $R^6$ represent methyl, ethyl, or trifluoromethyl.

$X^4$ has the same definition as that for $X^1$ in Formula (I-1) and the preferable range is the same as that of $X^1$ in Formula (I-1).

Examples of the group Z of substituent groups include:

an alkyl group (the number of carbon atoms of the alkyl group is preferably in a range of 1 to 30, more preferably in a range of 1 to 20, and particularly preferably in a range of 1 to 10, and examples thereof include methyl, ethyl, isopropyl, tert-butyl, n-octyl, n-decyl, and n-hexadecyl), a cycloalkyl group (the number of carbon atoms of the cycloalkyl group is preferably in a range of 3 to 30, more preferably in a range of 3 to 20, and particularly preferably in a range of 3 to 10, and examples thereof include cyclopropyl, cyclopentyl, and cyclohexyl), an alkenyl group (the number of carbon atoms of the alkenyl group is preferably in a range of 2 to 30, more preferably in a range of 2 to 20, and particularly preferably in a range of 2 to 10, and examples thereof include vinyl, allyl, 2-butenyl, and 3-pentenyl), an alkynyl group (the number of carbon atoms of the alkynyl group is preferably in a range of 2 to 30, more preferably in a range of 2 to 20, and particularly preferably in a range of 2 to 10, and examples thereof include propargyl and 3-pentynyl), an aryl group (the number of carbon atoms of the aryl group is preferably in a range of 6 to 30, more preferably in a range of 6 to 20, and particularly preferably in a range of 6 to 12, and examples thereof include phenyl, p-methylphenyl, naphthyl, and anthranyl), an amino group (such as an amino group, an alkylamino group, an arylamino group, or a heterocyclic amino group; the number of carbon atoms of the amino group is preferably in a range of 0 to 30, more preferably in a range of 0 to 20, and particularly preferably in a range of 0 to 10 and examples thereof include amino, methylamino, dimethylamino, diethylamino, dibenzylamino, diphenylamino, and ditolylamino), an alkoxy group (the number of carbon atoms of the alkoxy group is preferably in a range of 1 to 30, more preferably in a range of 1 to 20, and particularly preferably in a range of 1 to 10, and examples thereof include methoxy, ethoxy, butoxy, and 2-ethylhexyloxy), an aryloxy group (the number of carbon atoms of the aryloxy group is preferably in a range of 6 to 30, more preferably in a range of 6 to 20, and particularly preferably in a range of 6 to 12, and examples thereof include phenyloxy, 1-naphthyloxy, and 2-naphthyloxy), a heterocyclic oxy group (the number of carbon atoms of the heterocyclic oxy group is preferably in a range of 1 to 30, more preferably in a range of 1 to 20, and particularly preferably in a range of 1 to 12, and examples thereof include pyridyloxy, pyrazyloxy, pyrimidyloxy, and quinolyloxy), an acyl group (the number of carbon atoms of the acyl group is preferably in a range of 1 to 30, more preferably in a range of 1 to 20, and particularly preferably in a range of 1 to 12, and examples thereof include acetyl, benzoyl, formyl, and pivaloyl), an alkoxycarbonyl group (the number of carbon atoms of the alkoxycarbonyl group is preferably in a range of 2 to 30, more preferably in a range of 2 to 20, and particularly preferably in a range of 2 to 12, and examples thereof include methoxycarbonyl and ethoxycarbonyl), an aryloxycarbonyl group (the number of carbon atoms of the aryloxycarbonyl group is preferably in a range of 7 to 30, more preferably in a range of 7 to 20, and particularly preferably in a range of 7 to 12, and examples thereof include phenyloxycarbonyl), an acyloxy group (the number of carbon atoms of the acyloxy group is preferably in a range of 2 to 30, more preferably in a range of 2 to 20, and particularly preferably in a range of 2 to 10, and examples thereof include acetoxy and benzoyloxy), an acylamino group (the number of carbon atoms of the acylamino group is preferably in a range of 2 to 30, more preferably in a range of 2 to 20, and particularly preferably in a range of 2 to 10, and examples thereof include acetylamino and benzoylamino), an alkoxycarbonylamino group (the number of carbon atoms of the alkoxycarbonylamino group is preferably in a range of 2 to 30, more preferably in a range of 2 to 20, and particularly preferably in a range of 2 to 12, and examples thereof include methoxycarbonylamino), an aryloxycarbonylamino group (the number of carbon atoms of the aryloxycarbonylamino group is preferably in a range of 7 to 30, more preferably in a range of 7 to 20, and particularly preferably in a range of 7 to 12, and examples thereof include phenyloxycarbonylamino), a sulfonylamino group (the number of carbon atoms of the sulfonylamino group is preferably in a range of 1 to 30, more preferably in a range of 1 to 20, and particularly preferably in a range of 1 to 12, and examples thereof include methanesulfonylamino and benzenesulfonylamino), a sulfamoyl group (the number of carbon atoms of the sulfamoyl group is preferably in a range of 0 to 30, more preferably in a range of 0 to 20, and particularly preferably in a range of 0 to 12, and examples thereof include sulfamoyl, methylsulfamoyl, dimethylsulfamoyl, and phenylsulfamoyl), an alkylthio group (the number of carbon atoms of the alkylthio group is preferably in a range of 1 to 30, more preferably in a range of 1 to 20, and particularly preferably in a range of 1 to 12, and examples thereof include methylthio and ethylthio), an arylthio group (the number of carbon atoms of the arylthio group is preferably in a range of 6 to 30, more preferably in a range of 6 to 20, and particularly preferably in a range of 6 to 12, and examples thereof include phenylthio), a heterocyclic thio group (the number of carbon atoms of the heterocyclic thio group is preferably in a range of 1 to 30, more preferably in a range of 1 to 20, and particularly preferably in a range of 1 to 12, and examples thereof include pyridylthio, 2-benzimidazolylthio, 2-benzoxazolylthio, and 2-benzothiazolylthio), a sulfonyl group (the number of carbon atoms of the sulfonyl group is preferably in a range of 1 to 30, more preferably in a range of 1 to 20, and particularly preferably in a range of 1 to 12, and examples thereof include mesyl and tosyl), a sulfinyl group (the number of carbon atoms of the sulfinyl group is preferably in a range of 1 to 30, more preferably in a range of 1 to 20, and particularly preferably in a range of 1 to 12, and examples thereof include methanesulfinyl and benzenesulfinyl), an ureido group (the number of carbon atoms of the ureido group is preferably in a range of 1 to 30, more preferably in a range of 1 to 20, and particularly preferably in a range of 1 to 12, and examples thereof include ureido, methylureido, and phenylureido), a phosphoric acid amide group (the number of carbon atoms of the phosphoric acid amide group is preferably in a range of 1 to 30, more preferably in a range of 1 to 20, and particularly preferably in a range of 1 to 12, and examples thereof include diethyl phosphoric acid amide and phenyl phosphoric acid amide), a hydroxy group, a mercapto group, a halogen atom (such as a fluorine atom, a chlorine atom, a bromine atom, or an iodine atom, and a fluorine atom is more preferable), a cyano group, a sulfo group, a carboxyl group, an oxo group, a nitro group, a hydroxamic acid group, a sulfino group, a hydrazino group, an imino group, a heterocyclic group (a 3- to 7-membered ring heterocyclic group is preferable, the hetero ring may be aromatic or non-aromatic, examples of a heteroatom constituting the hetero ring include a nitrogen atom, an oxygen atom, and a sulfur atom, the number of carbon atoms of the heterocyclic group is preferably in a range of 0 to 30 and more preferably in a range of 1 to 12, and specific examples thereof include imidazolyl, pyridyl, quinolyl, furyl, thienyl, piperidyl, morpholino, benzoxazolyl, benzimidazolyl, benzothiazolyl, carbazolyl, and azepinyl), a silyl group (the number of carbon atoms of the silyl group is preferably in a range of 3 to 40, more preferably in a range of 3 to 30, and particularly preferably in a range of 3 to 24, and examples thereof include trimethylsilyl and triphenylsilyl), and a silyloxy group (the number of carbon atoms of the silyloxy group is preferably in a range of 3 to 40, more preferably in a range of 3 to 30, and particularly preferably in a range of 3 to 24, and examples thereof include trimethylsilyloxy and triphenylsilyloxy). These substituent groups may be substituted with any one or more substituent groups selected from the group Z of substituent groups.

Further, in the present invention, when a plurality of substituent groups are present at one structural site, these substituent groups may be linked to each other and form a ring or may be condensed with some or entirety of the structural site and form an aromatic ring or an unsaturated hetero ring.

When a compound or a substituent group includes an alkyl group or an alkenyl group, these may be linear or branched and may be substituted or non-substituted. In addition, when a compound or a substituent group includes an aryl group or a heterocyclic group, these may be a single ring or condensed and may be substituted or non-substituted.

In the present specification, when a group is described as only a substituent group, the group Z of substituent groups can be used as reference unless otherwise specified. Further, when only the names of the respective groups are described (for example, a group is described as an "alkyl group"), the preferable range and the specific examples of the corresponding group in the group Z of substituent groups are applied.

In the polyimide compound used in the present invention, the ratio of the repeating unit represented by Formula (I) or the repeating unit represented by Formula (II-a) or (II-b) to be incorporated as needed is not particularly limited and appropriately adjusted in consideration of gas permeability and gas separation selectivity according to the purpose of gas separation (recovery rate, purity, or the like).

In the polyimide compound used in the present invention, the amount of the repeating unit represented by Formula (I) is preferably 10% by mole or greater, more preferably 30% by mole or greater, still more preferably 50% by mole or greater, and may be 100% by mole with respect to the total amount (100% by mole) of the repeating units represented by Formulae (I), (II-a), and (II-b). When the number of polar groups included in the repeating unit represented by Formula (I) is great, the effects of the purpose can be obtained even if the amount of the repeating units represented by Formula (I) is somewhat reduced. It is preferable that the polyimide compound used in the present invention is configured of repeating units, all of which are formed of the repeating units represented by Formula (I), or configured of the repeating unit represented by Formula (I) and the repeating unit represented by Formula (II-a) or (II-b).

Moreover, in the polyimide compound used in the present invention, the content of polar groups selected from the group consisting of a carboxy group, a hydroxy group, an alkylamino group, an acylamino group, an alkoxy group, an acyloxy group, an alkoxycarbonyl group, an imidazole group, a triazole group, a tetrazole group, a cyano group, a sulfonamide group, an alkylsulfonyl group, and a mercapto group included in the repeating units represented by Formulae (I), (II-a), and (II-b) is preferably 0.2 mmol/g or greater, more preferably 0.5 mmol/g or greater, and still more preferably 1.0 mmol/g or greater.

The molecular weight of the polyimide compound used in the present invention as a weight average molecular weight is preferably in a range of 10000 to 1000000, more preferably in a range of 15000 to 500000, and still more preferably in a range of 20000 to 200000.

The molecular weight and the dispersity in the present specification are set to values measured using a gel permeation chromatography (GPC) method unless otherwise specified and the molecular weight is set to a weight average molecular weight in terms of polystyrene. A gel including an aromatic compound as a repeating unit is preferable as a gel filled into a column used for the GPC method and a gel formed of a styrene-divinylbenzene copolymer is exemplified. It is preferable that two to six columns are connected to each other and used. Examples of a solvent to be used include an ether-based solvent such as tetrahydrofuran and an amide-based solvent such as N-methylpyrrolidinone. It is preferable that measurement is performed at a flow rate of the solvent of 0.1 mL/min to 2 mL/min and most preferable that the measurement is performed at a flow rate thereof of 0.5 mL/min to 1.5 mL/min. When the measurement is performed in the above-described range, a load is not applied to the apparatus and the measurement can be more efficiently performed. The measurement temperature is preferably in a range of 10° C. to 50° C. and most preferably in a range of 20° C. to 40° C. In addition, the column and the carrier to be used can be appropriately selected according to the physical properties of a polymer compound which is a target for measurement.

(Synthesis of Polyimide Compound)

The polyimide compound which can be used in the present invention can be synthesized by performing condensation and polymerization of a specific bifunctional acid dianhydride (tetracarboxylic dianhydride) and a specific diamine. As the method, a technique described in a general book (for example, "*The Latest Polyimide ~Fundamentals and Applications~*" edited by Toshio Imai and Rikio Yokota, NTS Inc., Aug. 25, 2010, pp. 3 to 49) can be appropriately selected.

In the synthesis of the polyimide compound which can be used in the present invention, at least one tetracarboxylic dianhydride which is a raw material is represented by the following Formula (IV). It is preferable that all tetracarboxylic dianhydrides which are raw materials are represented by the following Formula (IV).

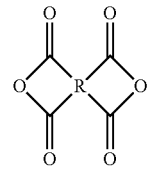

Formula (IV)

In Formula (IV), R has the same definition as that for R in Formula (I).

Specific examples of the tetracarboxylic dianhydride which can be used in the present invention are as follows.
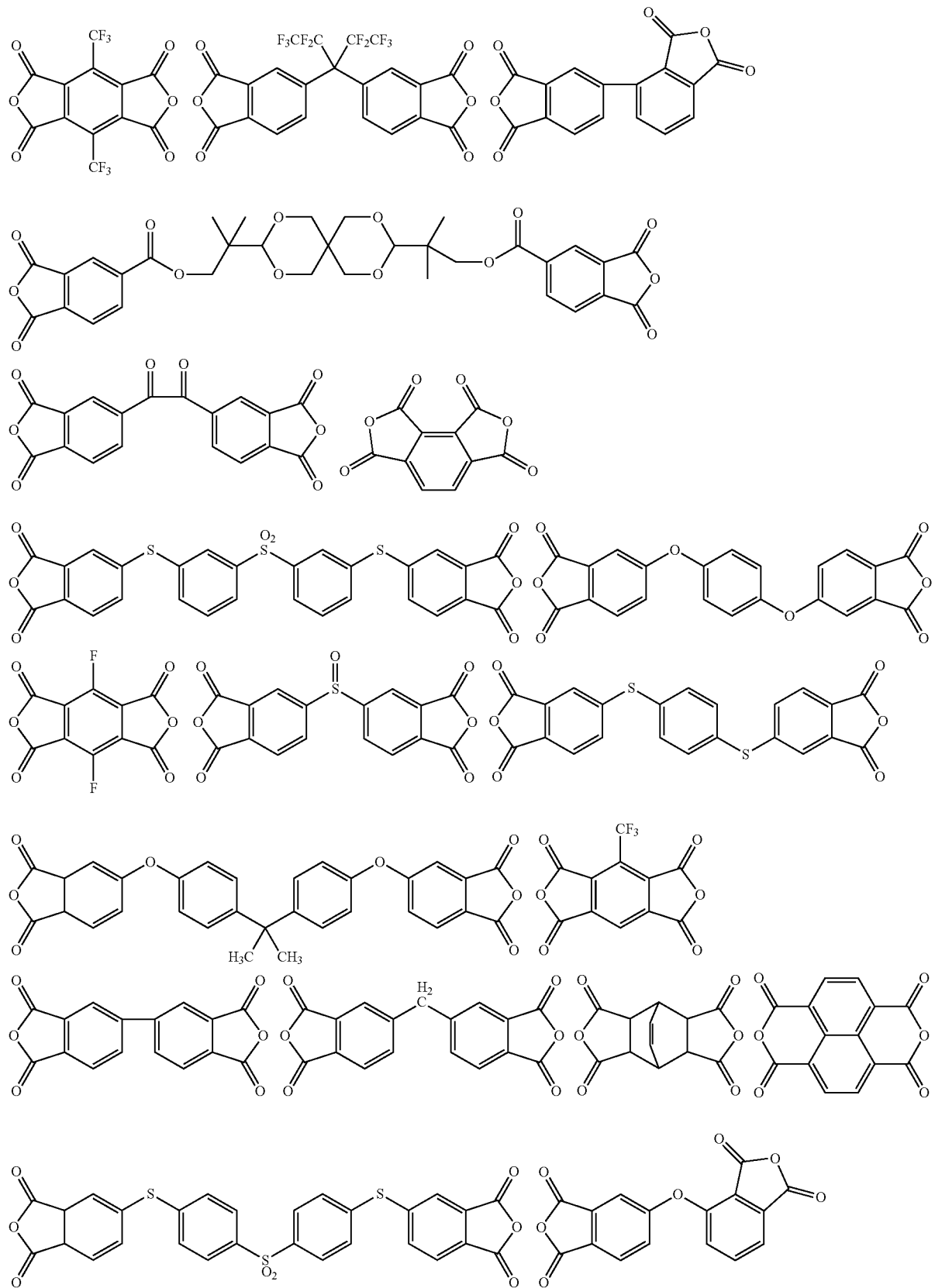

-continued
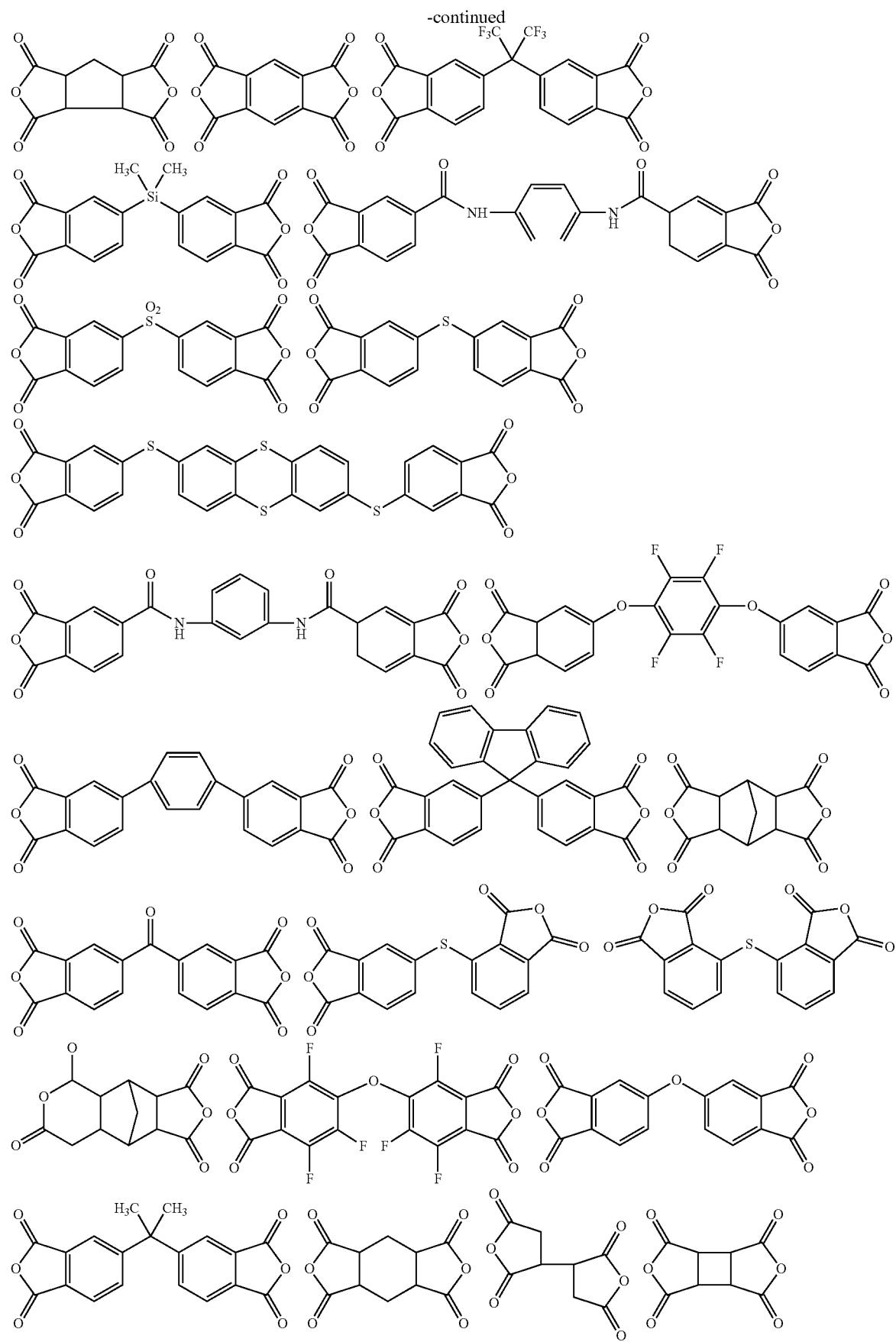

-continued
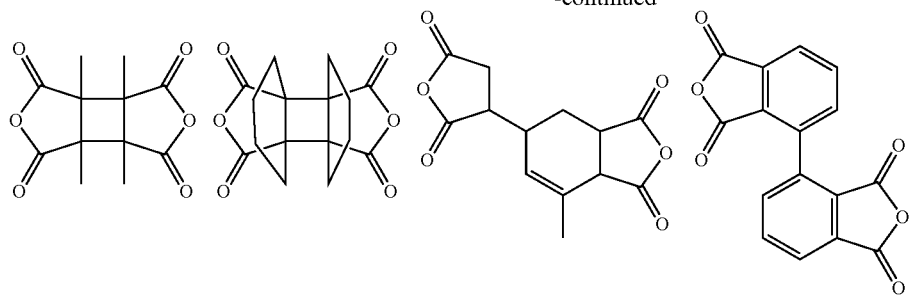
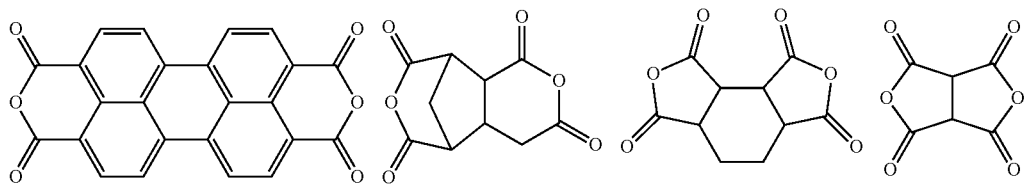
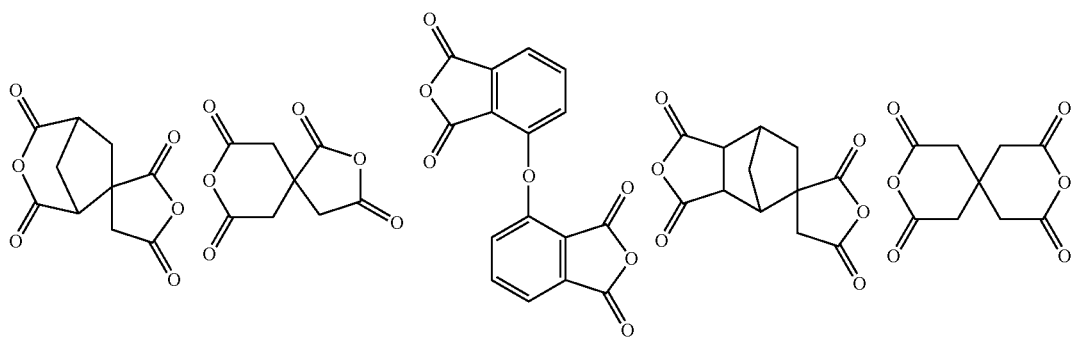
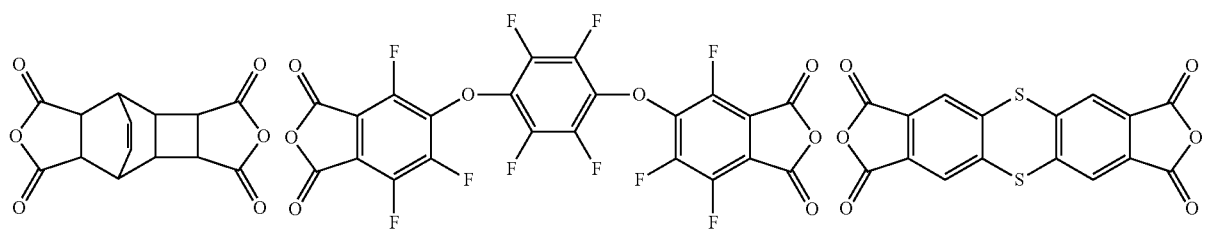
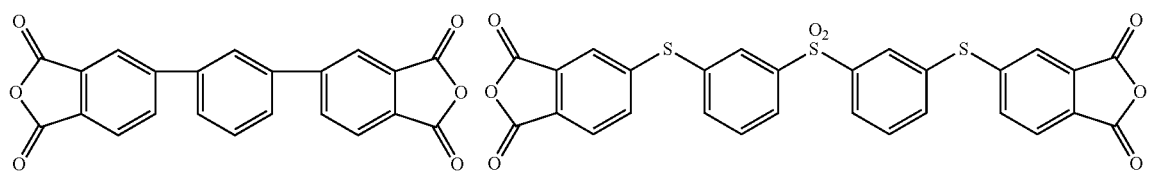
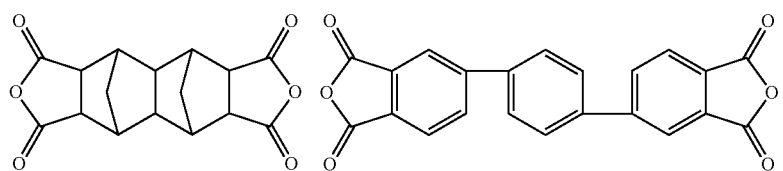
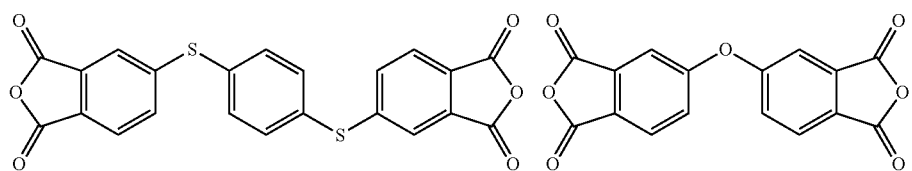

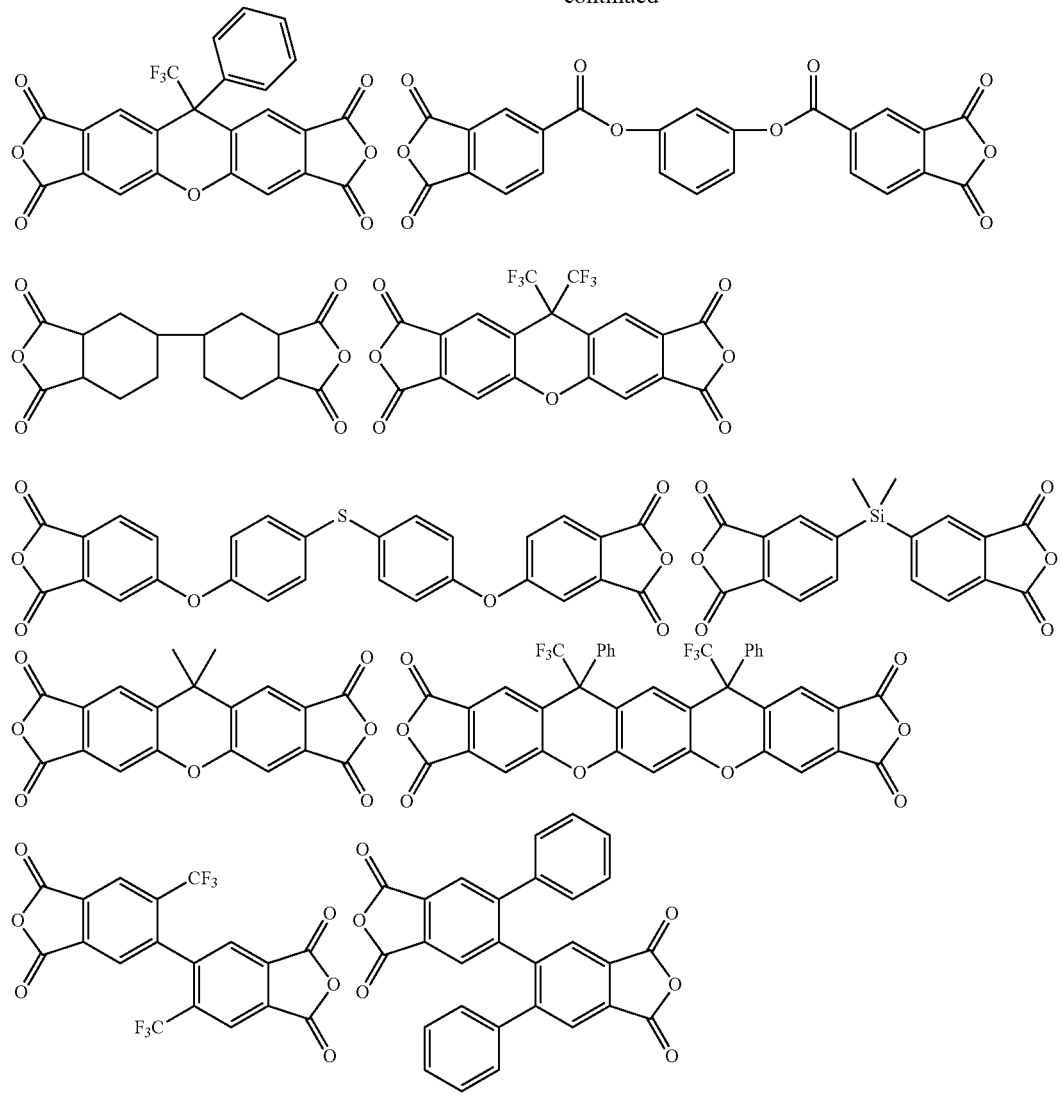

In the synthesis of the polyimide compound which can be used in the present invention, at least one diamine compound which is a raw material is represented by the following Formula (V).

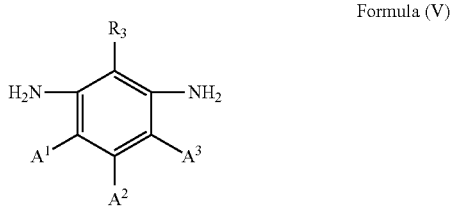

Formula (V)

In Formula (V), $R^3$ and $A^1$ to $A^3$ respectively have the same definitions as those for $R^3$ and $A^1$ to $A^3$ in Formula (I).

A diamine compound represented by Formula (V) can be synthesized by a reduction reaction of the corresponding dinitro compound. Examples of the reduction reaction include a method of using hydrazine, formic acid, hydride, iron, tin, or palladium and a method of catalytic hydrogenation. In the catalytic hydrogenation, it is preferable to use an alcohol-based solvent such as methanol from a viewpoint of reaction efficiency, but the diamine compound represented by Formula (V) has low solubility in an alcohol-based solvent in some cases. In this case, it is preferable that the alcohol-based solvent such as methanol and a highly polar solvent such as 1,3-dimethyl-2-imidazolidinone, N-methylpyrrolidone, dimethyl sulfoxide, dimethylacetamide, or dimethylformamide are used in combination from a viewpoint of achieving reaction efficiency and solubility of a product.

Specific examples of the diamine represented by Formula (V) are as follows.

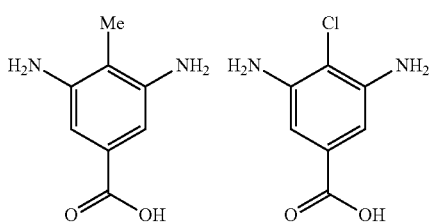

-continued
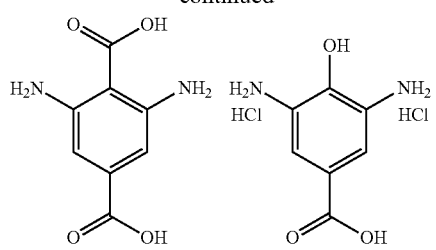
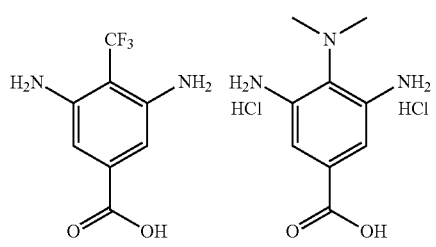
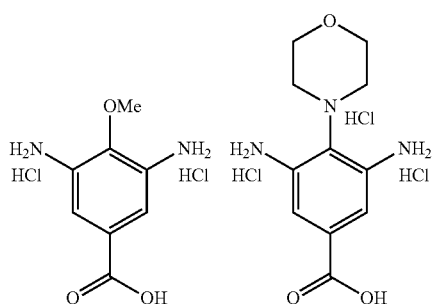
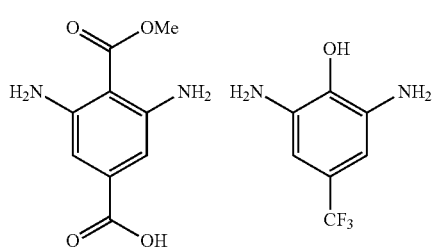
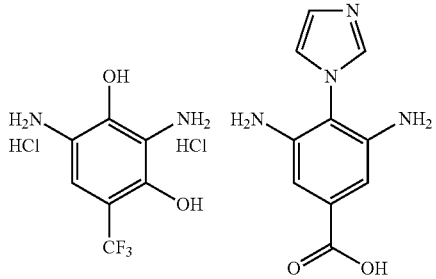
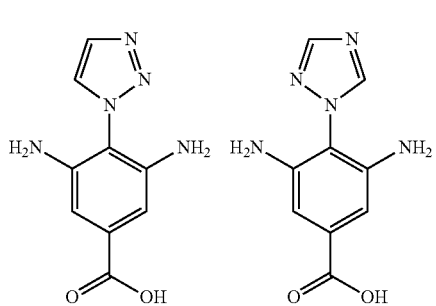
-continued
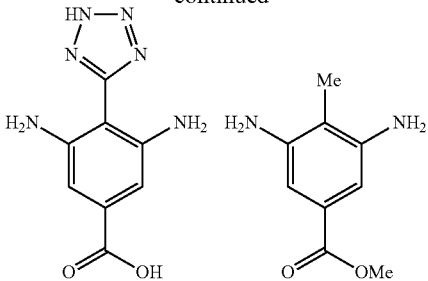
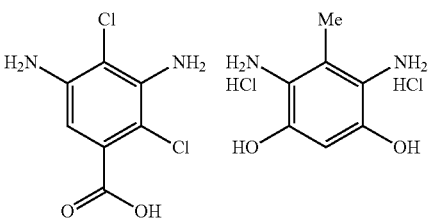
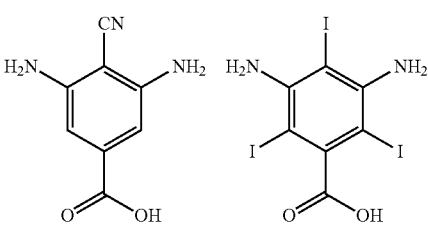
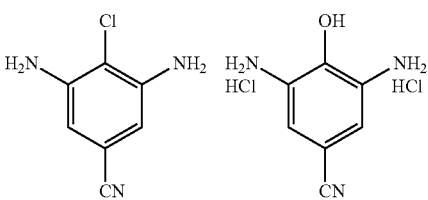
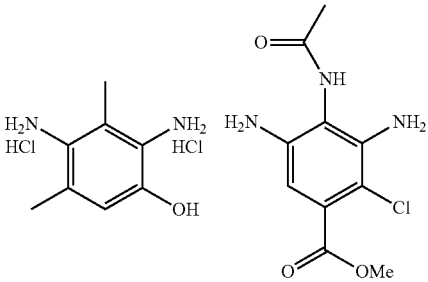
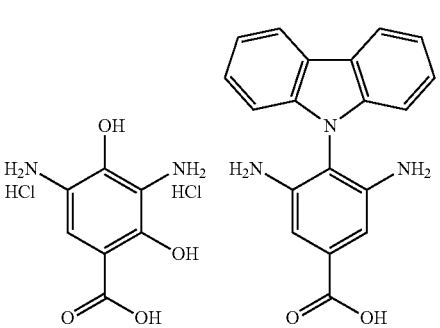

-continued

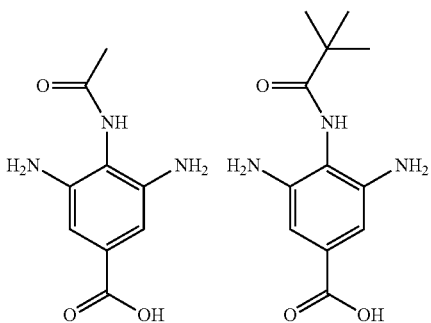
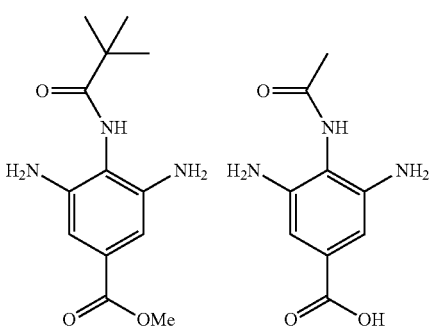
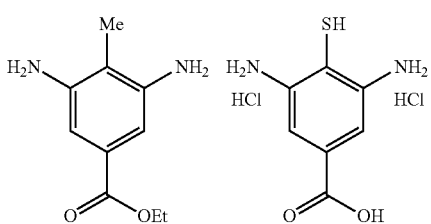
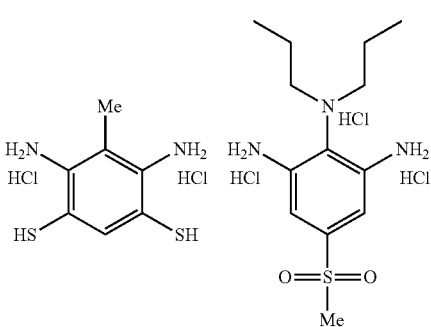

-continued

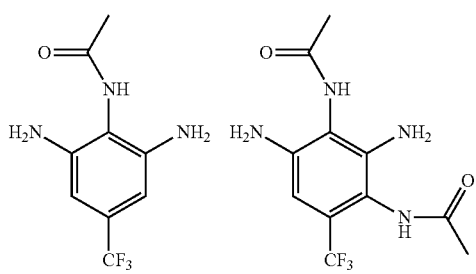

Further, in the synthesis of the polyimide compound which can be used in the present invention, a diamine represented by the following Formula (VII-a) or (VII-b) may be used as a diamine compound which is a raw material, in addition to the diamine represented by Formula (V).

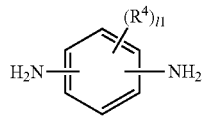

Formula (VII-a)

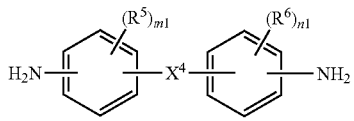

(Formula (VII-b))

In Formula (VII-a), $R^4$ and l1 respectively have the same definitions as those for $R^4$ and l1 in Formula (II-a). The diamine represented by Formula (V) is not included in the diamine represented by Formula (VII-a).

In Formula (VII-b), $R^5$, $R^6$, $X^4$, m1, and n1 respectively have the same definitions as those for $R^5$, $R^6$, $X^4$, m1, and n1 in Formula (II-b).

As the diamine represented by Formula (VII-a) or (VII-b), any of the following examples can be used.

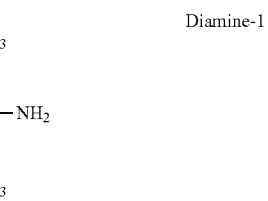

Diamine-1

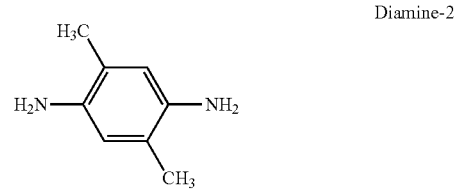

Diamine-2

Diamine-3

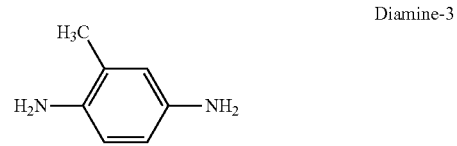

-continued
Diamine-4
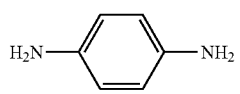
Diamine-5
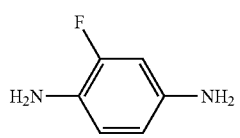
Diamine-6
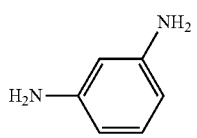
Diamine-7
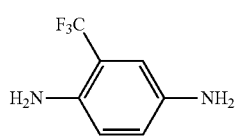
Diamine-8
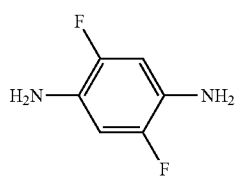
Diamine-9
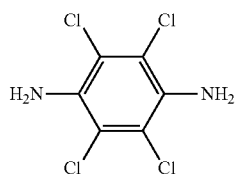
Diamine-10
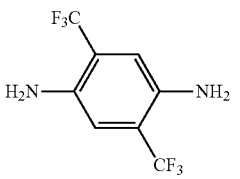
Diamine-11
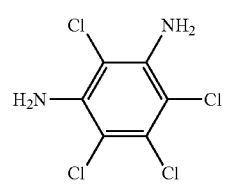
Diamine-12
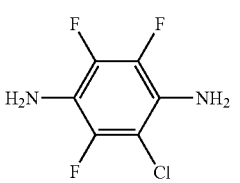
Diamine-13
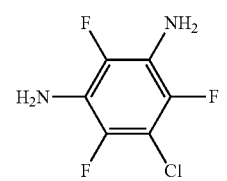
Diamine-14
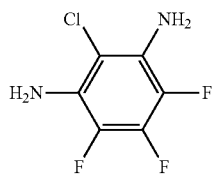
Diamine-15
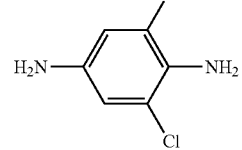
Diamine-16
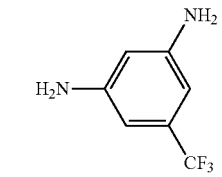
Diamine-17
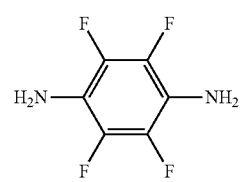
Diamine-18
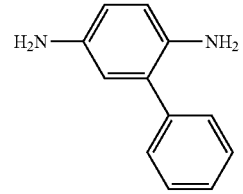
Diamine-19
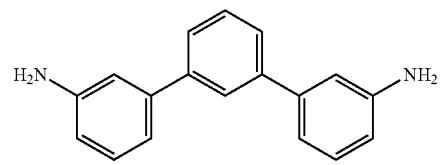
Diamine-20
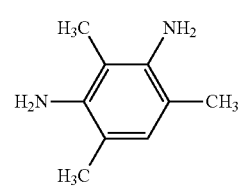
Diamine-31
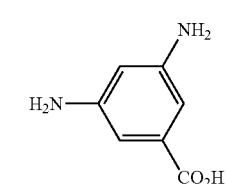
Diamine-32
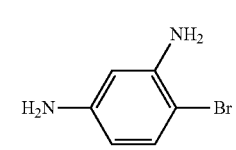

Diamine-33 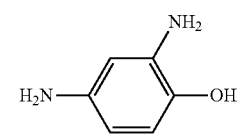
Diamine-34 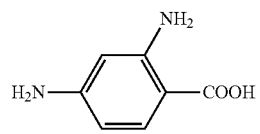
Diamine-35 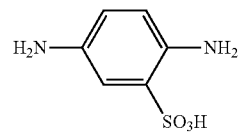
Diamine-36 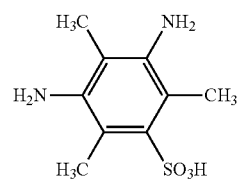
Diamine-37 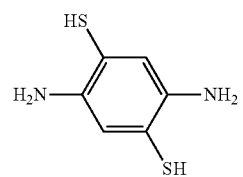
Diamine-38 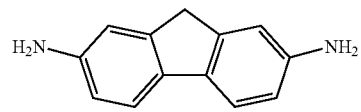
Diamine-39 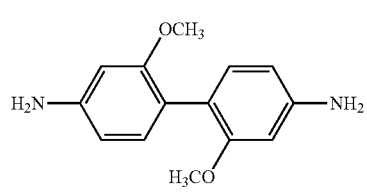
Diamine-40 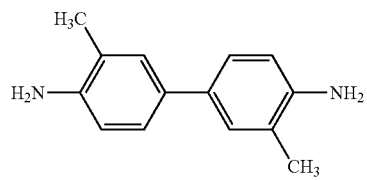
Diamine-41 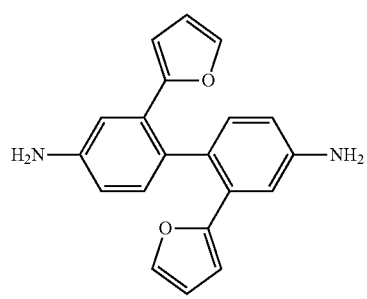
Diamine-42 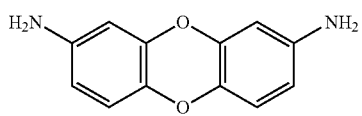
Diamine-43 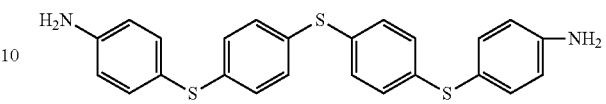
Diamine-44 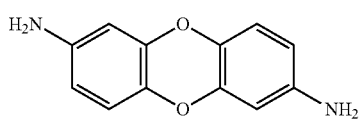
Diamine-45 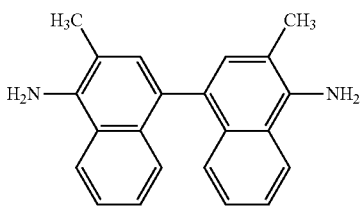
Diamine-46 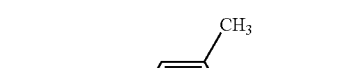
Diamine-47 
Diamine-48 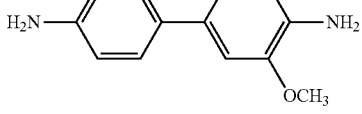
Diamine-49 
Diamine-50 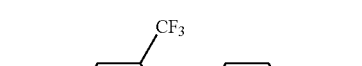
Diamine-51 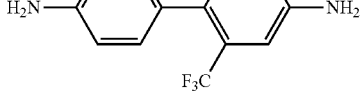

Diamine-52
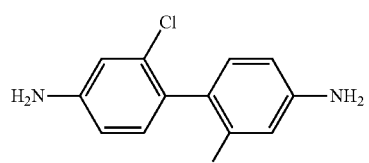
Diamine-53
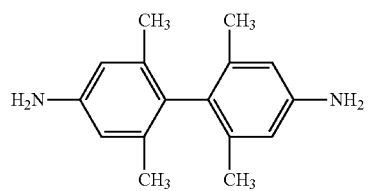
Diamine-54
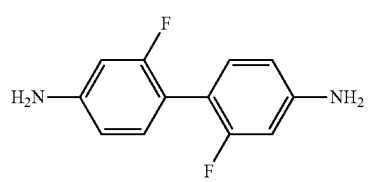
Diamine-55
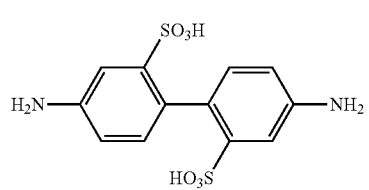
Diamine-56
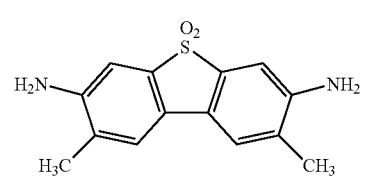
Diamine-57
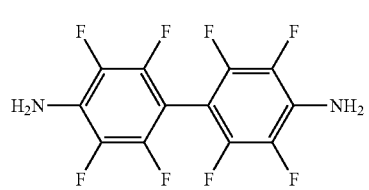
Diamine-58
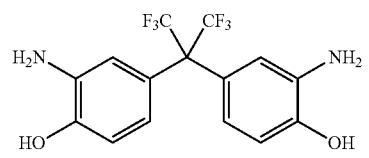
Diamine-59
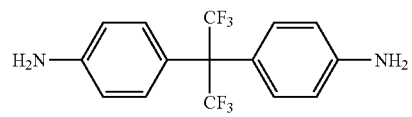
Diamine-60
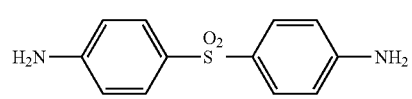
Diamine-61
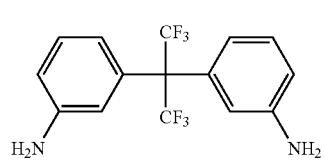
Diamine-62
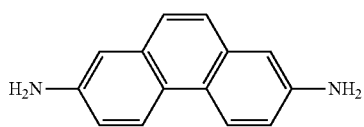
Diamine-63
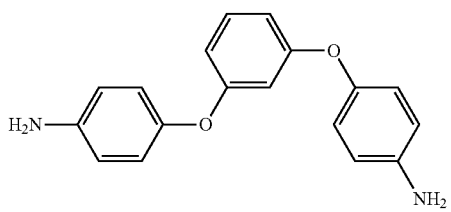
Diamine-64
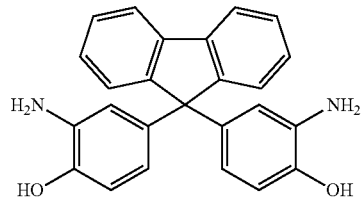
Diamine-65
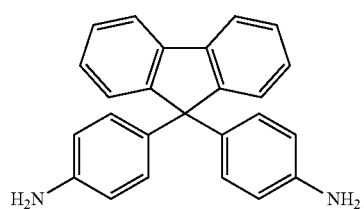
Diamine-66
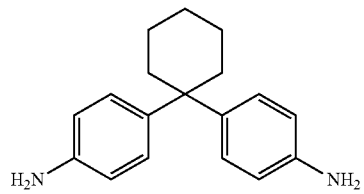
Diamine-67
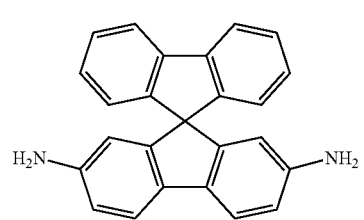
Diamine-68
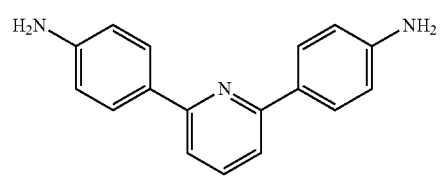

Diamine-69

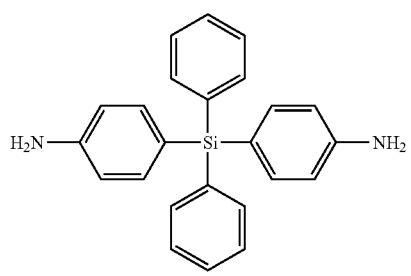

Diamine-70

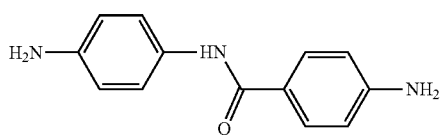

The monomer represented by Formula (IV) and the monomer represented by Formula (V), (VII-a), or (VII-b) may be used as an oligomer or a prepolymer in advance. The polyimide compound used in the present invention may be any one of a block copolymer, a random copolymer, and a graft copolymer.

The polyimide compound used in the present invention can be obtained by mixing the above-described respective raw materials in a solvent and performing condensation and polymerization using a normal method.

The solvent is not particularly limited. Examples thereof include an ester-based organic solvent such as methyl acetate, ethyl acetate, or butyl acetate; aliphatic ketone such as acetone, methyl ethyl ketone, methyl isobutyl ketone, diacetone alcohol, cyclopentanone, or cyclohexanone; an ether-based organic solvent such as ethylene glycol dimethyl ether, dibutyl butyl ether, t-butyl methyl ether, tetrahydrofuran, methyl cyclopentyl ether, or dioxane; an amide-based organic solvent such as N-methylpyrrolidone, 2-pyrrolidone, dimethylformamide, dimethylimidazolidinone, or dimethylacetamide; and a sulfur-containing organic solvent such as dimethyl sulfoxide or sulfolane. These organic solvents can be suitably selected within the range in which a tetracarboxylic dianhydride and a diamine compound which are reaction substrates, polyamic acid which is a reaction intermediate, and a polyimide compound which is a final product can be dissolved. Among these, an ester-based organic solvent (preferably butyl acetate), aliphatic ketone (preferably methyl ethyl ketone, methyl isobutyl ketone, diacetone alcohol, cyclopentanone, or cyclohexanone), an ether-based organic solvent (diethylene glycol monomethyl ether or methyl cyclopentyl ether), an amide-based organic solvent (preferably N-methylpyrrolidone), or a sulfur-containing organic solvent (dimethyl sulfoxide or sulfolane) is preferable. In addition, these can be used alone or in combination of two or more kinds thereof.

A temperature which can be normally employed for the synthesis of the polyimide compound can be employed without being particularly limited to the polymerization reaction temperature. Specifically, the temperature is preferably in a range of −40° C. to 60° C. and more preferably in a range of −30° C. to 50° C.

The polyimide compound can be obtained by imidizing the polyamic acid, which is generated by the above-described polymerization reaction, through a dehydration ring-closure reaction in a molecule. As a method of the dehydration ring-closure reaction, a method described in a general book (for example, "*The Latest Polyimide ~Fundamentals and Applications~*" edited by Toshio Imai and Rikio Yokota, NTS Inc., Aug. 25, 2010, pp. 3 to 49) can be used as reference. A thermal imidization method of performing heating in a temperature range 120° C. to 200° C. and removing water generated as a by-product to the outside the system for a reaction or a so-called chemical imidization method in which a dehydrating condensation agent such as an acetic anhydride, dicyclohexylcarbodiimide, or triphenyl phosphite is used in the coexistence of a basic catalyst such as pyridine, trimethylamine, or DBU is preferably used.

In the present invention, the total concentration of the tetracarboxylic dianhydride and the diamine compound in the polymerization reaction solution of the polyimide compound is not particularly limited. The total concentration thereof is preferably in a range of 5% by mass to 70% by mass, more preferably in a range of 5% by mass to 50% by mass, and still more preferably in a range of 5% by mass to 30% by mass.

[Gas Separation Membrane]

(Composite Gas Separation Membrane)

In the composite gas separation membrane which is a preferred embodiment of the gas separation membrane of the present invention, a gas separation layer containing a specific polyimide compound is formed on the upper side of a support layer having gas permeability. It is preferable that the composite membrane is formed by coating (the term "coating" in the present specification includes a form made by a coating material being adhered to a surface through immersion) at least the surface of a porous support with a coating solution (dope) that forms the above-described gas separation layer.

Figure 2:
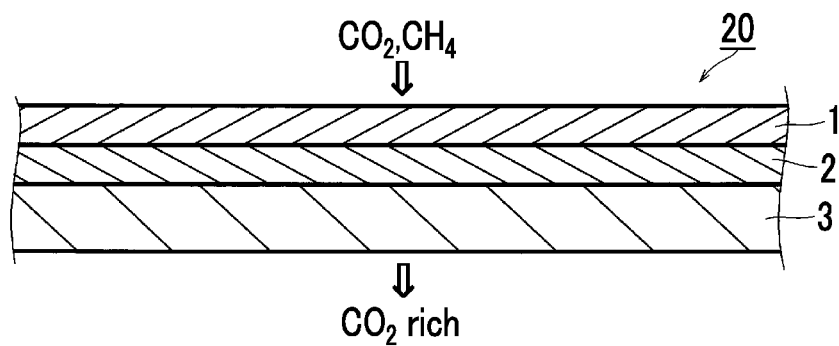
FIG. 2 is a sectional view schematically illustrating another embodiment of a composite gas separation membrane of the present invention.

FIG. 1 is a longitudinal sectional view schematically illustrating a composite gas separation membrane 10 which is a preferred embodiment of the present invention. The reference numeral 1 indicates a gas separation layer and the reference numeral 2 is a support layer formed of a porous layer. FIG. 2 is a sectional view schematically illustrating a composite gas separation membrane 20 which is another preferred embodiment of the present invention. In the embodiment, a non-woven fabric layer 3 is added as the support layer in addition to the gas separation layer 1 and the porous layer 2.

The expression "the upper side of the support layer" in the present specification means that another layer may be interposed between the support layer and the gas separation layer. In regard to the expressions related to up and down, the direction in which gas to be separated is supplied to is set as "up" and the direction in which the separated gas is discharged is set as "down" unless otherwise specified.

The composite gas separation membrane of the present invention may be obtained by forming and arranging a gas separation layer on the surface or inner surface of the porous support (support layer) and a composite membrane can be conveniently obtained by forming a gas separation layer at least on the surface thereof. When the gas separation layer is formed at least on the surface of the porous support, a composite membrane with an advantage of having high separation selectivity, high gas permeability, and mechanical strength at the same time can be obtained. It is preferable that the separation layer is as thin as possible from a viewpoint that high gas permeability is provided while mechanical strength and separation selectivity are maintained.

In the composite gas separation membrane of the present invention, the thickness of the gas separation layer is not particularly limited. The thickness thereof is preferably in a range of 0.01 µm to 5.0 µm and more preferably in a range of 0.05 µm to 2.0 µm.

The material of the porous support (porous layer) which is preferably applied to the support layer is not particularly limited and may be an organic or inorganic material as long as the material satisfies the purpose of providing mechanical strength and high gas permeability. A porous membrane of an organic polymer is preferable. The thickness thereof is typically in a range of 1 µm to 3000 µm, preferably in a range of 5 µm to 500 µm, and more preferably in a range of 5 µm to 150 µm. In regard to the pore structure of the porous membrane, the average pore diameter is normally 10 µm or less, preferably 0.5 µm or less, and more preferably 0.2 µm or less. The porosity is preferably in a range of 20% to 90% and more preferably in a range of 30% to 80%. Further, the molecular weight cut-off of the porous layer is preferably 100000 or less. Moreover, the gas permeability is preferably $3 \times 10^{-5}$ cm$^3$ (STP)/cm$^2$·sec·cmHg (30 GPU) or greater, more preferably 100 GPU or greater, and still more preferably 200 GPU or greater in terms of the permeation rate of carbon dioxide at 40° C. and 4 MPa. Examples of the material of the porous membrane include optional polymers, for example, various resins such as a polyolefin resin such as polyethylene or polypropylene; a fluorine-containing resin such as polytetrafluoroethylene, polyvinyl fluoride, or polyvinylidene fluoride; polystyrene, cellulose acetate, polyurethane, polyacrylonitrile, polyphenylene oxide, polysulfone, polyether sulfone, polyimide, and polyaramid. As the shape of the porous membrane, any of a flat shape, a spiral shape, a tabular shape, and a hallow fiber shape can be employed.

In the composite gas separation membrane of the present invention, it is preferable that a support used to provide mechanical strength is formed in the lower portion of the support layer that forms the gas separation layer. Examples of such a support include woven fabric, non-woven fabric, and a net. In terms of film forming properties and the cost, non-woven fabric is preferably used. As the non-woven fabric, fibers formed of polyester, polypropylene, polyacrylonitrile, polyethylene, and polyamide may be used alone or in combination of plural kinds thereof. The non-woven fabric can be produced by papermaking main fibers and binder fibers which are uniformly dispersed in water using a circular net or a long net and then drying the fibers with a drier. Moreover, for the purpose of removing a nap or improving mechanical properties, it is preferable that thermal pressing processing is performed on the non-woven fabric by interposing the non-woven fabric between two rolls.

<Method of Producing Composite Gas Separation Membrane>

As the method of producing the composite gas separation membrane of the present invention, a production method that forms a gas separation layer by coating a support with a coating solution containing the polyimide compound is preferable. The content of the polyimide compound in the coating solution is not particularly limited. The content thereof is preferably in a range of 0.1% by mass to 30% by mass and more preferably in a range of 0.5% by mass to 10% by mass. When the content of the polyimide compound is extremely low, defects are highly likely to be generated on the surface layer that contributes to separation due to the polyimide compound easily infiltrating into the lower layer when a film is formed on the porous support. Meanwhile, when the content of the polyimide compound is extremely high, a pore is filled with the polyimide compound at a high concentration when a film is formed on the porous support and thus transparency may be degraded. The gas separation membrane of the present invention can be appropriately produced by adjusting the molecular weight, the structure, the composition, and the solution viscosity of a polymer of the separation layer.

—Organic Solvent—

The organic solvent serving as a medium of the coating solution is not particularly limited. Examples thereof include a hydrocarbon-based organic solvent such as n-hexane or n-heptane; an ester-based organic solvent such as methyl acetate, ethyl acetate, or butyl acetate; lower alcohol such as methanol, ethanol, n-propanol, isopropanol, n-butanol, isobutanol, or tert-butanol; aliphatic ketone such as acetone, methyl ethyl ketone, methyl isobutyl ketone, diacetone alcohol, cyclopentanone, or cyclohexanone; an ether-based organic solvent such as ethylene glycol, diethylene glycol, triethylene glycol, glycerin, propylene glycol, ethylene glycol monomethyl or monoethyl ether, propylene glycol methyl ether, dipropylene glycol methyl ether, tripropylene glycol methyl ether, ethylene glycol phenyl ether, propylene glycol phenyl ether, diethylene glycol monomethyl or monoethyl ether, diethylene glycol monobutyl ether, triethylene glycol monomethyl or monoethyl ether, dibutyl butyl ether, tetrahydrofuran, methyl cyclopentyl ether, or dioxane; N-methylpyrrolidone; 2-pyrrolidone; dimethylformamide; dimethylimidazolidinone; dimethyl sulfoxide; and dimethylacetamide. These organic solvents can be suitably selected within the range not adversely affecting the support through erosion or the like. An ester-based organic solvent (preferably butyl acetate), an alcohol-based organic solvent (preferably methanol, ethanol, isopropanol, or isobutanol), aliphatic ketone (preferably methyl ethyl ketone, methyl isobutyl ketone, diacetone alcohol, cyclopentanone, or cyclohexanone), or an ether-based organic solvent (ethylene glycol, diethylene glycol monomethyl ether, or methyl cyclopentyl ether) is preferable. An aliphatic ketone-based organic solvent, an alcohol-based organic solvent, or an ether-based organic solvent is more preferable. In addition, these solvents can be used alone or in combination of two or more kinds thereof.

<Another Layer Between Support Layer and Gas Separation Layer>

Another layer may be provided between the support layer and the gas separation layer in the composite gas separation membrane of the present invention. A siloxane compound layer is exemplified as a preferred example of another layer. When the siloxane compound layer is provided, it is possible to smooth unevenness of the outermost surface of the support and thus the separation layer is easily thinned. As the siloxane compound forming the siloxane compound layer, a compound whose main chain is formed of polysiloxane or a compound having a siloxane structure and a non-siloxane structure in the main chain is exemplified.

—Siloxane Compound Whose Main Chain is Formed of Polysiloxane—

As the siloxane compound which is used in the siloxane compound layer and whose main chain is formed of polysiloxane, one or more kinds of polyorganosiloxanes represented by the following Formula (1) or (2) are exemplified. In addition, these polyorganosiloxanes may form a crosslinking reaction material. As the crosslinking reaction material, a compound represented by the following Formula (1), which is cross-linked by a polysiloxane compound having groups reacting with a reactive group X of the following Formula (1) for connection in both terminals thereof, is exemplified.

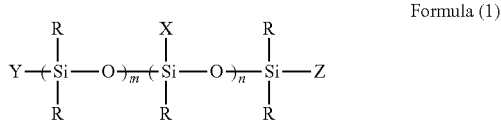

Formula (1)

In Formula (1), it is preferable that R represents a non-reactive alkyl group (the number of carbon atoms of the alkyl group is preferably in a range of 1 to 18 and more preferably in a range of 1 to 12) or a non-reactive aryl group (the number of carbon atoms of the aryl group is preferably in a range of 6 to 15 and more preferably in a range of 6 to 12, and phenyl is still more preferable).

It is preferable that X represents a reactive group and is selected from a hydrogen atom, a halogen atom, a vinyl group, a hydroxyl group, and a substituted alkyl group (the number of carbon atoms of the alkyl group is in a range of 1 to 18 and more preferably in a range of 1 to 12).

Y and Z are respectively the same as R and X described above.

The viscosity of the siloxane compound used in the present invention is not particularly limited. The viscosity at 25° C. is preferably in a range of 10 mPa·s to 100000 mPa·s and more preferably in a range of 20 mPa·s to 50000 mPa·s.

m represents an integer of 1 or greater and is preferably in a range of 1 to 100000. n represents an integer of 0 or greater and is preferably in a range of 0 to 100000.

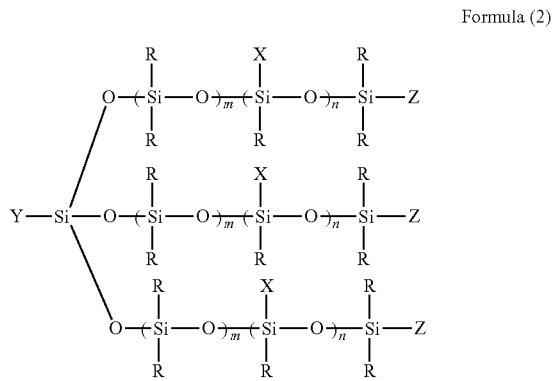

Formula (2)

In Formula (2), X, Y, Z, R, m, and n respectively have the same definitions as those for X, Y, Z, R, m, and n of Formula (1).

In Formulae (1) and (2), in a case where the non-reactive group R is an alkyl group, examples of the alkyl group include methyl, ethyl, hexyl, octyl, decyl, and octadecyl. Further, in a case where the non-reactive group R is a fluoroalkyl group, examples of the fluoroalkyl group include —$CH_2CH_2CF_3$ and —$CH_2CH_2C_6F_{13}$.

In Formulae (1) and (2), in a case where the reactive group X is a substituted alkyl group, examples of the alkyl group include a hydroxyalkyl group having 1 to 18 carbon atoms, an aminoalkyl group having 1 to 18 carbon atoms, a carboxyalkyl group having 1 to 18 carbon atoms, a chloroalkyl group having 1 to 18 carbon atoms, a glycidoxyalkyl group having 1 to 18 carbon atoms, a glycidyl group, an epoxychclohexyl alkyl group having 7 to 16 carbon atoms, a (1-oxacyclobutane-3-yl)alkyl group having 4 to 18 carbon atoms, a metacryloxy alkyl group, and a mercaptoalkyl group.

The number of carbon atoms of the alkyl group constituting the hydroxyalkyl group is preferably an integer of 1 to 10 and examples thereof include —$CH_2CH_2CH_2OH$.

The number of carbon atoms of the alkyl group constituting the aminoalkyl group is preferably an integer of 1 to 10 and examples thereof include —$CH_2CH_2CH_2NH_2$.

The number of carbon atoms of the alkyl group constituting the carboxyalkyl group is preferably an integer of 1 to 10 and examples thereof include —$CH_2CH_2CH_2COOH$.

The number of carbon atoms of the alkyl group constituting the chloroalkyl group is preferably an integer of 1 to 10 and preferred examples thereof include —$CH_2Cl$.

The number of carbon atoms of the alkyl group constituting the glycidoxyalkyl group is preferably an integer of 1 to 10 and preferred examples thereof include 3-glycidyloxypropyl.

The number of carbon atoms of the epoxycyclohexylalkyl group having 7 to 16 carbon atoms is preferably an integer of 8 to 12.

The number of carbon atoms of the (1-oxacyclobutane-3-yl)alkyl group having 4 to 18 carbon atoms is preferably an integer of 4 to 10.

The number of carbon atoms of the alkyl group constituting the methacryloxyalkyl group is preferably an integer of 1 to 10 and examples thereof include —$CH_2CH_2CH_2$—OOC—$C(CH_3)$=$CH_2$.

The number of carbon atoms of the alkyl group constituting the mercaptoalkyl group is preferably an integer of 1 to 10 and examples thereof include —$CH_2CH_2CH_2SH$.

It is preferable that m and n represent an integer in which the molecular weight of the compound is in a range of 5000 to 1000000.

In Formulae (1) and (2), distribution of reactive group-containing siloxane units (in the formula, constituent units whose number is represented by n) and siloxane units (in the formula, constituent units whose number is represented by m) which does not include a reactive group is not particularly limited. That is, in Formulae (1) and (2), (Si(R)(R)—O) units and (Si(R)(X)—O) units may be distributed in a random manner.

—Compound Having Siloxane Structure and Non-Siloxane Structure in Main Chain Thereof—

Examples of a compound which can be used for a siloxane compound layer and has a siloxane structure and a non-siloxane structure in the main chain thereof include compounds represented by the following Formulae (3) to (7).

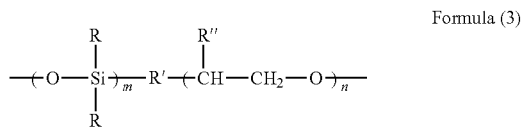

Formula (3)

In Formula (3), R, m, and n respectively have the same definitions as those for R, m, and n of Formula (1). R' represents —O— or —$CH_2$— and R" represents a hydrogen atom or methyl. It is preferable that both terminals of Formula (3) are an amino group, a hydroxyl group, a carboxy group, a trimethylsilyl group, an epoxy group, a vinyl group, a hydrogen atom, or a substituted alkyl group.

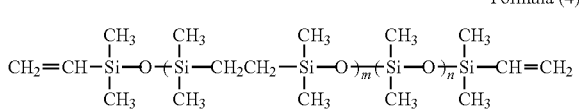

Formula (4)

In Formula (4), m and n respectively have the same definitions as those for m and n in Formula (1).

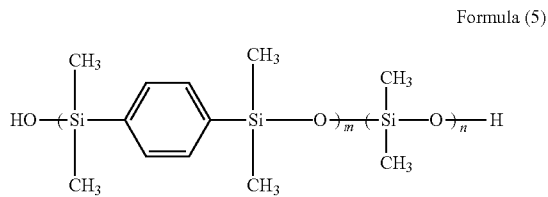

Formula (5)

In Formula (5), m and n respectively have the same definitions as those for m and n in Formula (1).

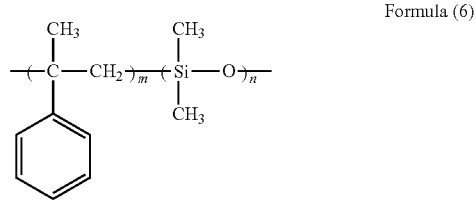

Formula (6)

In Formula (6), m and n respectively have the same definitions as those for m and n of Formula (1). It is preferable that both terminals of Formula (6) are bonded to an amino group, a hydroxyl group, a carboxy group, a trimethylsilyl group, an epoxy group, a vinyl group, a hydrogen atom, or a substituted alkyl group.

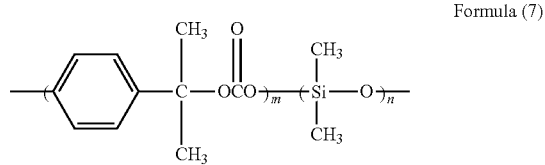

Formula (7)

In Formula (7), m and n respectively have the same definitions as those for m and n of Formula (1). It is preferable that both terminals of Formula (7) are bonded to an amino group, a hydroxyl group, a carboxy group, a trimethylsilyl group, an epoxy group, a vinyl group, a hydrogen atom, or a substituted alkyl group.

In Formulae (3) to (7), the siloxane structural units and the non-siloxane structural units may be distributed in a random manner.

The compound having a siloxane structure and a non-siloxane structure in the main chain thereof contains preferably 50% by mole or greater of the siloxane structural units and more preferably 70% by mole or greater of the siloxane structural units with respect to the total number of moles of the entirety of the repeating structural units.

The weight average molecular weight of the siloxane compound used for the siloxane compound layer is preferably in a range of 5000 to 1000000 from a viewpoint of thinning a membrane and durability. The method of measuring the weight average molecular weight is as described above.

Further, preferred examples of the siloxane compound constituting the siloxane compound layer include the following:

Polydimethylsiloxane, polymethylphenylsiloxane, polydiphenylsiloxane, a polysulfone-polyhydroxystyrene-polydimethylsiloxane copolymer, a dimethylsiloxane-methylvinylsiloxane copolymer, a dimethyl siloxane-diphenyl siloxane-methylvinylsiloxane copolymer, a methyl-3,3,3-trifluoropropylsiloxane-methylvinylsiloxane copolymer, a dimethylsiloxane-methylphenylsiloxane-methylvinylsiloxane copolymer, a vinyl terminated diphenylsiloxane-dimethylsiloxane copolymer, vinyl terminated polydimethylsiloxane, H-terminated polydimethylsiloxane, and a dimethylsiloxane-methylhydrosiloxane copolymer. Further, one or more kinds selected from the above can be used. Moreover, these may be used to form a crosslinking reaction material.

In the composite membrane of the present invention, the thickness of the siloxane compound layer is preferably in a range of 0.01 µm to 5 µm and more preferably in a range of 0.05 µm to 1 µm from a viewpoint of smoothness and gas permeability.

Moreover, the gas permeability of the siloxane compound layer at 40° C. and 4 MPa is preferably 100 GPU or greater, more preferably 300 GPU or greater, and still more preferably 1000 GPU or greater in terms of the carbon dioxide permeation rate.

(Gas Separation Asymmetric Membrane)

The gas separation membrane of the present invention may be an asymmetric membrane. The asymmetric membrane can be formed by a phase inversion method using a solution containing a polyimide compound. The phase inversion method is a known method of allowing a polymer solution to be brought into contact with a coagulating liquid for phase inversion to form a membrane, and a so-called dry-wet method is preferably used in the present invention. The dry-wet method is a method of forming a porous layer by evaporating a solution on the surface of a polymer solution which is made to have a membrane shape to form a thin dense layer, immersing the formed dense layer in a coagulating liquid (a solvent which is compatible with a solvent of a polymer solution and in which a polymer is insoluble), and forming fine pores using a phase separation phenomenon that occurs at this time, and this method is suggested by Loeb and Sourirajan (for example, the specification of U.S. Pat. No. 3,133,132A).

In the gas separation asymmetric membrane of the present invention, the thickness of the surface layer contributing to gas separation which is referred to as a dense layer or a skin layer is not particularly limited, but the thickness thereof is preferably in a range of 0.01 µm to 5.0 µm and more preferably in a range of 0.05 µm to 1.0 µm from a viewpoint of proving practical gas permeability. Meanwhile, a porous layer positioned in a portion lower than a dense layer decreases resistance of gas permeability and plays a role of providing mechanical strength at the same time. Further, the thickness thereof is not particularly limited as long as independence as an asymmetric membrane is provided, but is preferably in a range of 5 µm to 500 µm, more preferably in a range of 5 µm to 200 µm, and still more preferably in a range of 5 µm to 100 µm.

The gas separation asymmetric membrane of the present invention may be a flat membrane or a hollow fiber membrane. An asymmetric hollow fiber membrane can be produced by a dry-wet spinning method. The dry-wet spinning method is a method of forming an asymmetric hollow fiber membrane by applying a dry-wet method to a polymer solution which is discharged from a spinning nozzle in a target shape of a hollow fiber. More specifically, the dry-wet spinning method is a method in which a polymer solution is discharged from a nozzle in a target shape of a hollow fiber and passes through air or a nitrogen gas atmosphere immediately after the discharge, a polymer is not substantially dissolved and is immersed in a coagulating liquid which is compatible with a solvent of the polymer solution to form an asymmetric structure and then is dried, and a heat treatment is applied thereto as needed to produce a separation membrane.

It is preferable that the solution viscosity of a solution containing the polyimide compound discharged from a nozzle is in a range of 2 Pa·s to 17000 Pa·s, preferably 10 Pa·s to 1500 Pa·s, and particularly preferably in a range of 20 Pa·s to 1000 Pa·s at the discharge temperature (for example, 10° C.) from a viewpoint of stably obtaining the shape after the discharge such as a hollow fiber shape or the like. It is preferable that immersion of a polymer in a coagulating liquid is carried out by immersing the polymer in a primary coagulating liquid to be solidified to the extent that the shape of a membrane such as a hollow fiber can be maintained, winding the membrane around a guide roll, immersing the membrane in a secondary coagulating liquid, and sufficiently solidifying the whole membrane. It is effective that the solidified membrane is dried after the coagulating liquid is substituted with a solvent such as hydrocarbon. It is preferable that the heat treatment for performing drying is carried out at a temperature lower than a softening point or a secondary transition point of the used polyimide compound.

In order to improve mechanical strength, the tensile strength of the gas separation asymmetric membrane of the present invention is preferably 10 N/mm$^2$ or greater and more preferably 12 N/mm$^2$ or greater. The upper limit of the tensile strength, which is not particularly limited, is typically 25 N/mm$^2$ or less and may be 20 N/mm$^2$ or less. Further, the compression strength of the gas separation asymmetric membrane of the present invention is preferably 10 MPa or greater and more preferably 15 MPa or greater. The upper limit of the compression strength, which is not particularly limited, is typically 50 MPa or less and may be 40 MPa or less.

In order to provide the mechanical strength and moderate flexibility for the gas separation asymmetric membrane of the present invention, the elongation at break of the gas separation asymmetric membrane of the present invention is preferably 12% or greater and more preferably 16% or greater. The upper limit of the elongation at break, which is not particularly limited, is typically 25% or less and may be 20% or less. In addition, from the same viewpoint described above, the tensile elastic modulus of the gas separation asymmetric membrane of the present invention is preferably 100 MPa or less, more preferably 90 MPa or less, and still more preferably 80 MPa or less. For the purpose of achieving balance between the mechanical strength and the tensile elastic modulus, the lower limit of the tensile elastic modulus thereof is typically 10 MPa or greater, preferably 20 MPa or greater, more preferably 30 MPa or greater, and still more preferably 40 MPa or greater.

(Use and Characteristics of Gas Separation Membrane)

The gas separation membrane (the composite membrane and the asymmetric membrane) of the present invention can be suitably used according to a gas separation recovery method and a gas separation purification method. For example, a gas separation membrane which is capable of efficiently separating specific gas from a gas mixture containing gas, for example, hydrocarbon such as hydrogen, helium, carbon monoxide, carbon dioxide, hydrogen sulfide, oxygen, nitrogen, ammonia, a sulfur oxide, a nitrogen oxide, methane, or ethane; unsaturated hydrocarbon such as propylene; or a perfluoro compound such as tetrafluoroethane can be obtained. Particularly, it is preferable that a gas separation membrane selectively separating carbon dioxide from a gas mixture containing carbon dioxide and hydrocarbon (methane) is obtained.

In addition, in a case where gas subjected to a separation treatment is mixed gas of carbon dioxide and methane, the permeation rate of the carbon dioxide at 40° C. and 5 MPa is preferably greater than 20 GPU, more preferably greater than 30 GPU, and still more preferably in a range of 50 GPU to 500 GPU. The ratio between permeation rates of carbon dioxide and methane ($R_{CO2}/R_{CH4}$) is preferably 15 or greater, more preferably 20 or greater, still more preferably 23 or greater, and particularly preferably in a range of 25 to 50. $R_{CO2}$ represents the permeation rate of carbon dioxide and $R_{CH4}$ represents the permeation rate of methane.

Further, 1 GPU is $1\times10^{-6}$ cm$^3$ (STP)/cm$^2$·cm·sec·cmHg (Other Components)

Since membrane physical properties are adjusted, various polymer compounds can be added to the gas separation layer of the gas separation membrane of the present invention. Examples of the polymer compound which can be used include an acrylic polymer, a polyurethane resin, a polyamide resin, a polyester resin, an epoxy resin, a phenol resin, a polycarbonate resin, a polyvinyl butyral resin, a polyvinyl formal resin, shellac, a vinyl resin, an acrylic resin, a rubber-based resin, waxes, and other natural resins. Further, these may be used in combination of two or more kinds thereof.

Moreover, a non-ionic surfactant, a cationic surfactant, or an organic fluoro compound can be added in order to adjust liquid properties.

Specific examples of the surfactant include anionic surfactants such as alkyl benzene sulfonate, alkyl naphthalene sulfonate, higher fatty acid salts, sulfonate of higher fatty ester, sulfuric ester salts of higher alcohol ether, sulfonate of higher alcohol ether, alkyl carboxylate of higher alkyl sulfonamide, and alkyl phosphate; non-ionic surfactants such as polyoxyethylene alkyl ether, polyoxyethylene alkyl phenyl ether, polyoxyethylene fatty acid ester, sorbitan fatty acid ester, an ethylene oxide adduct of acetylene glycol, an ethylene oxide adduct of glycerin, and polyoxyethylene sorbitan fatty acid ester; and amphoteric surfactants such as alkyl betaine and amide betaine; a silicon-based surfactant; and a fluorine-based surfactant, and the surfactant can be suitably selected from optional surfactants and derivatives thereof.

Further, a polymer dispersant may be included, and specific examples of the polymer dispersant include polyvinyl pyrrolidone, polyvinyl alcohol, polyvinyl methyl ether, polyethylene oxide, polyethylene glycol, polypropylene glycol, and polyacrylamide. Among these, polyvinyl pyrrolidone is preferably used.

The conditions of forming the gas separation membrane of the present invention are not particularly limited. The temperature thereof is preferably in a range of −30° C. to 100° C., more preferably in a range of −10° C. to 80° C., and particularly preferably in a range of 5° C. to 50° C.

In the present invention, when a membrane is formed, gas such as air or oxygen may be allowed to coexist. It is desired that the membrane is formed under an inert gas atmosphere.

In the gas separation membrane of the present invention, the content of the polyimide compound in the gas separation layer is not particularly limited as long as target gas separation performance can be obtained. From a viewpoint of improving the gas separation performance, the content of the polyimide compound in the gas separation layer is preferably 20% by mass or greater, more preferably 40% by mass or greater, still more preferably 60% by mass or greater, and particularly preferably 70% by mass or greater. Further, the content of the polyimide compound in the gas separation layer may be 100% by mass. The content thereof is normally 99% by mass or less.

[Method of Separating Gas Mixture]

The gas separation method of the present invention is a method that includes a process of selectively transmitting carbon dioxide from mixed gas containing carbon dioxide and methane. The pressure at the time of gas separation is preferably in a range of 0.5 MPa to 10 MPa, more preferably in a range of 1 MPa to 10 MPa, and still more preferably in a range of 2 MPa to 7 MPa. Further, the gas separation temperature is preferably in a range of −30° C. to 90° C. and more preferably in a range of 15° C. to 70° C. In the mixed gas containing carbon dioxide and methane gas, the mixing ratio of carbon dioxide to methane gas is not particularly limited. The mixing ratio thereof (carbon dioxide:methane gas) is preferably in a range of 1:99 to 99:1 (volume ratio) and more preferably in a range of 5:95 to 90:10.

[Gas Separation Module and Gas Separation Device]

The gas separation membrane of the present invention is a composite membrane combining a porous support with a gas separation layer and a gas separation module can be prepared using the gas separation membrane. Examples of the module include a spiral type module, a hollow fiber type module, a pleated module, a tubular module, and a plate & frame type module.

Moreover, when the composite gas separation membrane or the gas separation module of the present invention is used, it is possible to obtain a gas separation device having means for performing separation and recovery of gas or performing separation and purification of gas. The composite gas separation membrane of the present invention may be applied to a gas separation and recovery apparatus which is used together with an absorption liquid described in JP2007-297605A according to a membrane/absorption hybrid method.

EXAMPLES

The present invention will be described in detail with reference to examples, but the present invention is not limited these examples.

Synthesis Example

<Synthesis of Polyimide (P-01)>

According to a method described in Journal of Medicinal Chemistry 1978, 21, pp. 930 to 935, 3,5-diamino-4-methylbenzoate was synthesized.

9.69 g (58 mmol) of 3,5-diamino-4-methylbenzoate and 78 mL of N-methylpyrrolidone were added to a 500 mL flask, the mixture was heated at 40° C. for 30 minutes in a nitrogen atmosphere for complete dissolution, and a diamine solution was prepared. 71 mL of N-methylpyrrolidone was added to a 2 L three-neck flask was cooled to −10° C. with ice-cold methanol in a nitrogen atmosphere. When 25.91 g (58 mmol) of 6FDA (manufactured by Tokyo Chemical Industry Co., Ltd.) was added to the cooled N-methylpyrrolidone and completely dissolved therein, a diamine solution prepared in advance was added dropwise over 30 minutes while the temperature was maintained to 0° C. or lower using a chemical pump, and the mixture was washed with 14 mL of N-methylpyrrolidone. The temperature of the reaction solution was set to 40° C., the solution was stirred for 3.5 hours, 1.38 g (17.45 mmol) of pyridine (manufactured by Wako Pure Chemical Industries, Ltd.) and 19.65 g (192.48 mmol) of acetic anhydride were added thereto, and the reaction solution was heated to 80° C. and stirred for 3 hours. The reaction solution was cooled to room temperature, 247 mL of acetone, 42 mL of water/acetone (=1:1 vol %), and 132 mL of acetic acid were added thereto, and the solution was stirred for 30 minutes. Here, 800 mL of methanol was added thereto for 10 minutes using a chemical pump, and P-01 was precipitated as white powder. Re-slurry was repeatedly performed on the suction-filtered white powder four times for 30 minutes using a mixed solution of 712 mL of methanol and 79 mL of acetone, N-methylpyrrolidone was removed such that the proportion thereof was 0.1% or less and the resultant was dried at 70° C. for 12 hours using an air drier, thereby obtaining 31.3 g (yield: 90%) of polyimide (P-01) formed of the following structural unit (repeating unit).

[Formula (I)]

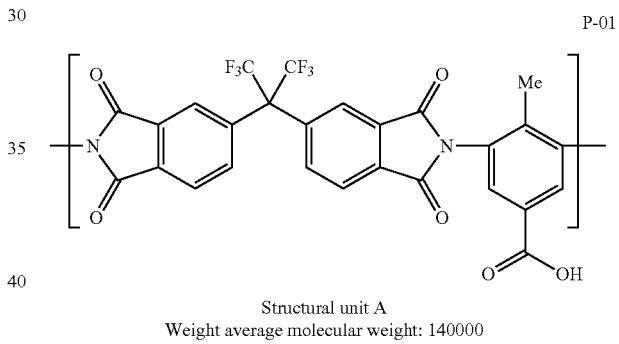

Structural unit A
Weight average molecular weight: 140000

<Synthesis of Polyimides (P-02 to P-15) and Comparative Polyimides 01 and 02>

Polyimides (P-02 to P-15 and comparative polyimides 01 and 02) formed of the following structural units (repeating units) were synthesized in the same manner as in Synthesis Example described above. The comparative polyimide 02 was synthesized according to a method descried in U.S. Pat. No. 7,247,191 B2.

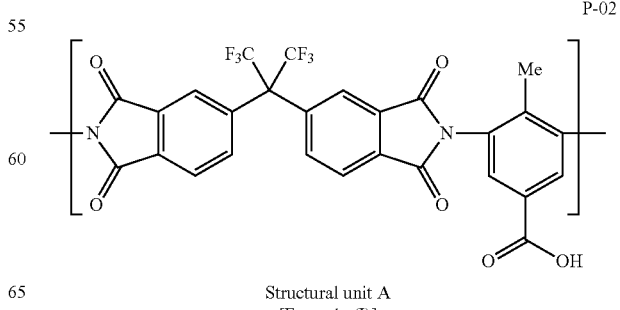

Structural unit A
[Formula (I)]

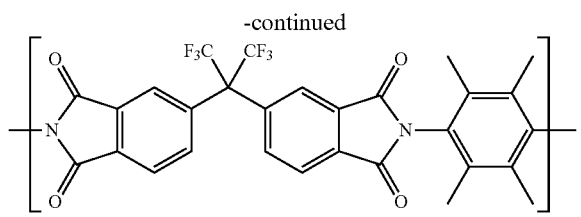

Structural unit B
[Formula (II-a)]

Structural unit A:Structural unit B = 70:30 (molar ratio)
Weight average molecular weight 130000

P-03

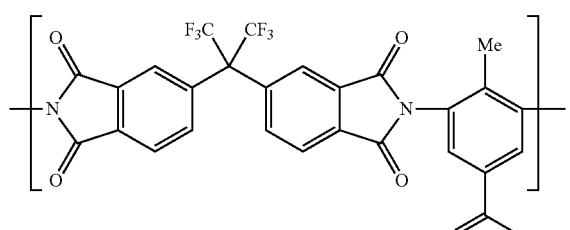

Structural unit A
[Formula (I)]

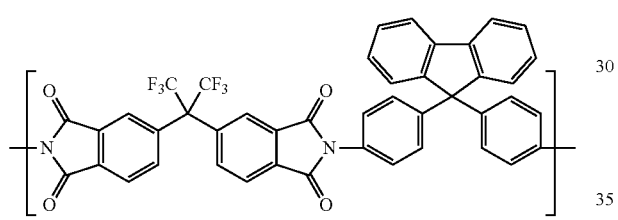

Structural unit C
[Formula (II-b)]

Structural unit A:Structural unit C = 90:10 (molar ratio)
Weight average molecular weight 120000

P-04

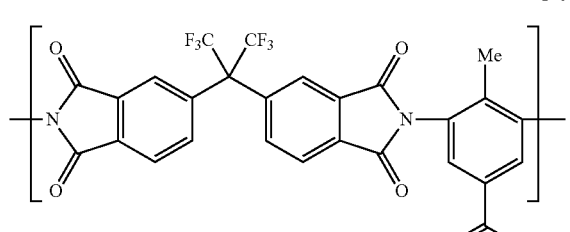

Structural unit A
[Formula (I)]

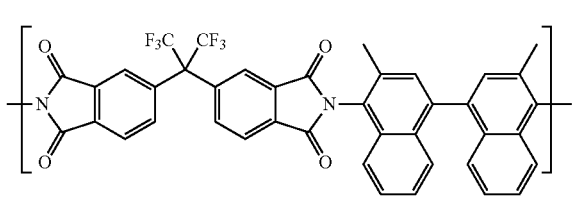

Structural unit D
[Formula (II-b)]

Structural unit A:Structural unit B = 90:10 (molar ratio)
Weight average molecular weight 100000

P-05

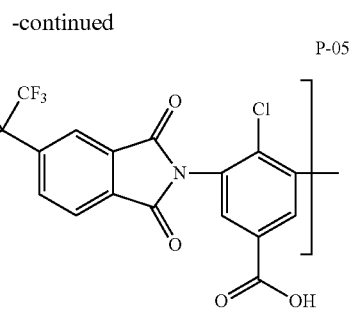

Structural unit E
[Formula (I)]

Weight average molecular weight 90000

P-06

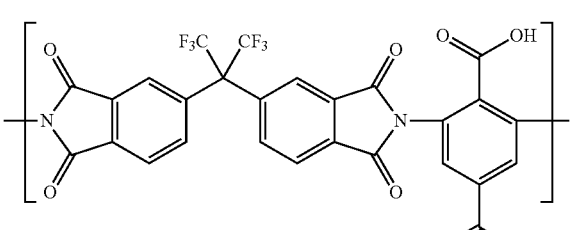

Structural unit F
[Formula (I)]

Weight average molecular weight 80000

P-07

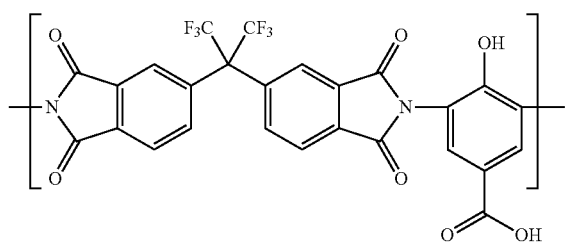

Structural unit G
[Formula (I)]

Weight average molecular weight 200000

P-08

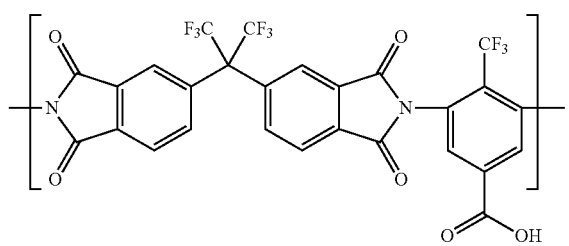

Structural unit H
[Formula (I)]

Weight average molecular weight 50000

-continued

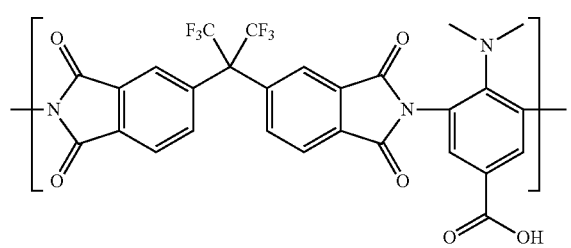

Structural unit I
[Formula (I)]

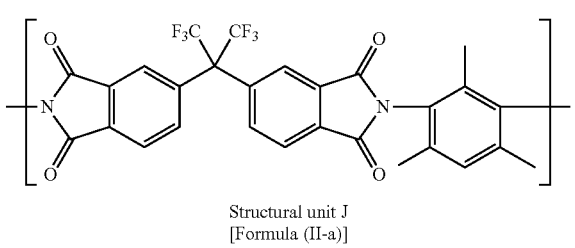

Structural unit J
[Formula (II-a)]

Structural unit I:Structural unit J = 50:50 (molar ratio)
Weight average molecular weight 70000

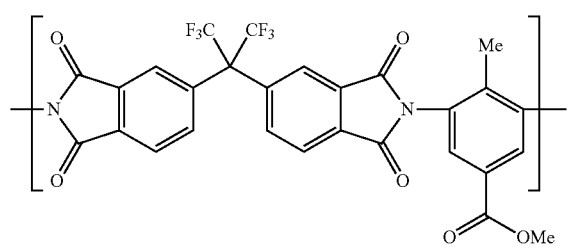

Structural unit K
[Formula (I)]
Weight average molecular weight 130000

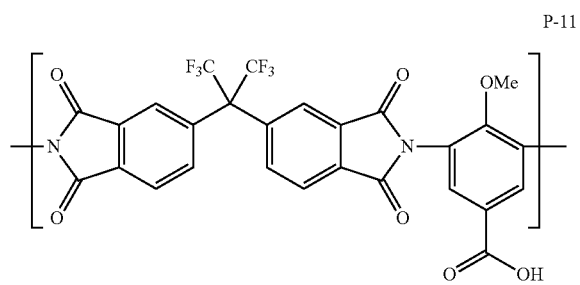

Structural unit L
[Formula (I)]
Weight average molecular weight 100000

-continued

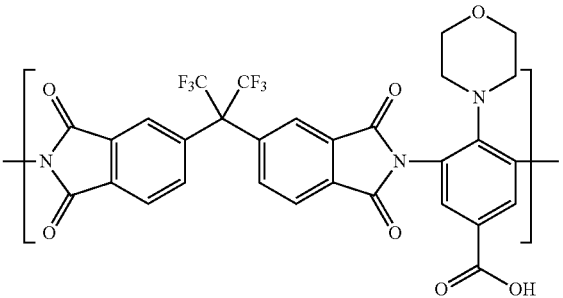

Structural unit M
[Formula (I)]

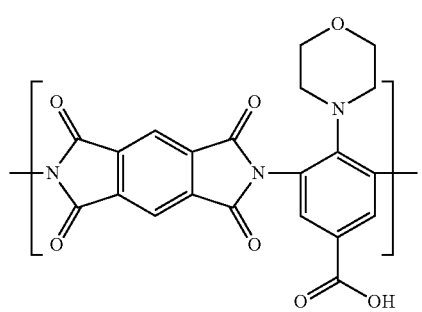

Structural unit N
[Formula (I)]

Structural unit M:Structural unit N = 70:30 (molar ratio)
Weight average molecular weight 60000

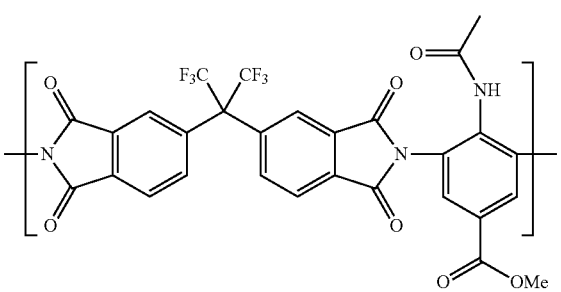

Structural unit O
[Formula (I)]

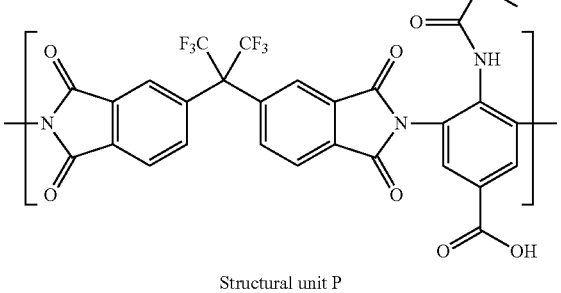

Structural unit P
[Formula (I)]

Structural unit O:Structural unit P = 50:50 (molar ratio)
Weight average molecular weight 70000

P-14

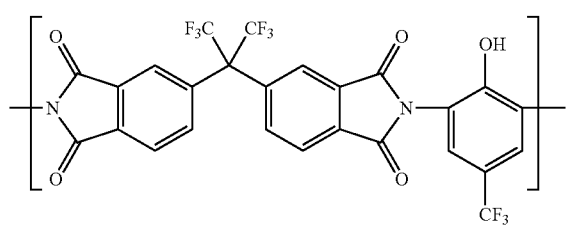

Structural unit Q
[Formula (I)]

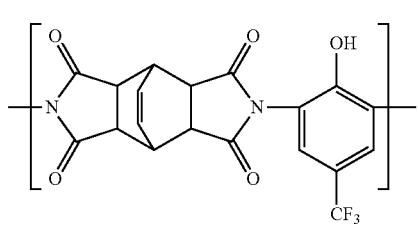

Structural unit R
[Formula (I)]

Structural unit Q:Structural unit R = 70:30 (molar ratio)
Weight average molecular weight 220000

P-15

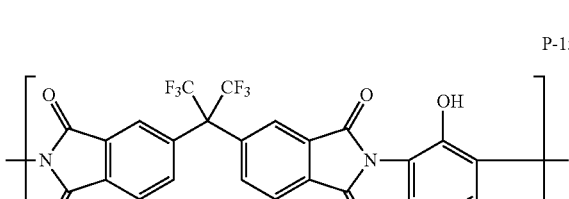

Structural unit S
[Formula (I)]

Weight average molecular weight: 120000

Comparative polyimide 01

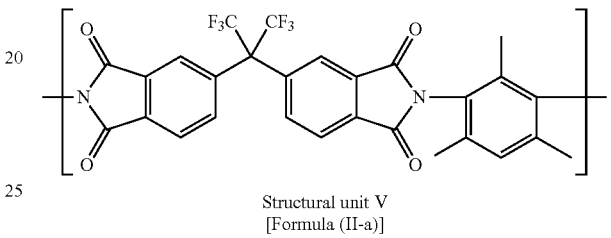

Structural unit T
[Formula (II-a)]

Weight average molecular weight: 150000

Comparative polyimide 02

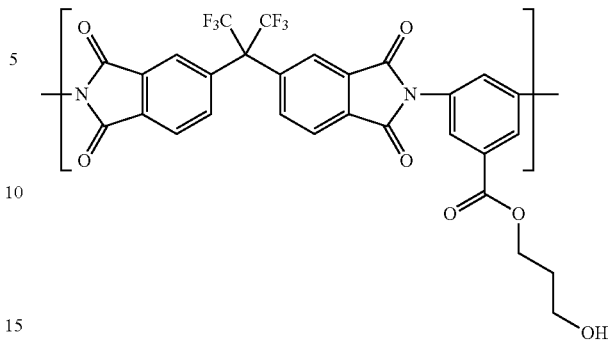

Structural unit U
[Formula (II-a)]

Structural unit V
[Formula (II-a)]

Structural unit U:Structural unit V = 40:60 (molar ratio)
Weight average molecular weight 130000

<Synthesis of Polyimide (P-16)>

130 g (575 mmol) of 3,5-dinitro-4-methylbenzoate (manufactured by Tokyo Chemical Industry Co., Ltd.) was added to a 2 L flask, and then 556 mL of 1,3-dimethyl-2-imidazolidinone and 739 mL of methanol were added thereto and completely dissolved. After the solution of 3,5-dinitro-4-methylbenzoate was moved to a Hastelloy pressure vessel (capacity: 2.2 L, manufactured by Nitto Koatsu Chemical Industries, Ltd.), 26 g of palladium carbon (the content of palladium: 5% by mass, approximately 50 mass % water wet product, manufactured by Kawaken Fine Chemicals Co., Ltd.) was added thereto, 1.0 MPa to 8.0 MPa of a hydrogen pressure was applied thereto while the mixture was stirred, and catalytic hydrogenation was performed. The hydrogen pressure and the temperature of a heater were adjusted during the catalytic hydrogenation, the temperature of the reaction solution was maintained to a range of 35° C. to 45° C., and the reaction solution was continuously stirred for 7 hours. The reaction solution was not cooled such that the temperature remained at approximately 40° C. and the product or the like was not precipitated, was moved to the 2 L flask from the pressure vessel using an aspirator, and rapidly filtered through Celite, and then palladium carbon was removed. 1400 mL of pure water was added to a red-brown solution obtained through filtration, crude diamine (M-01) was allowed to be precipitated as pale yellow powder, and the mixture was stirred at room temperature for 1 hour and was suction filtered. After the obtained pale yellow powder was re-slurry washed with 300 mL of acetonitrile and 1,3-dimethyl-2-imidazolidinone was removed such that the proportion thereof was 0.1% or less, the resultant was dried under reduced pressure at 110° C. for 8 hours using a vacuum drier, thereby obtaining 66.0 g of 3,5-diamino-4-methylbenzoate (yield: 69%, water content: 0.05%) as a target diamine. $^{1}$H NMR (300 MHz, DMSO-$d_6$) δ1. 85 (s, 3H), 4.68-6.41 (brs, 4H), 6.59 (s, 2H)

7.711 g (46.40 mmol) of 3,5-diamino-4-methylbenzoate obtained through the synthesis described above, 1.743 (11.60 mmol) of 2,4,6-trimethyl-1,3-phenylenediamine, and 165 mL of N-methylpyrrolidone were added to a 2 L flask, and the mixture was stirred and completely dissolved in a nitrogen atmosphere. The solution was cooled to −10° C. with ice-cold methanol, 25.77 g (58.00 mmol) of 6FDA (manufactured by Tokyo Chemical Industry Co., Ltd.) was added thereto, and the mixture was washed with 20 mL of N-methylpyrrolidone. The temperature of the reaction solution was increased to 40° C. using an oil bath and the solution was stirred for 5 hours. 1.38 g (17.4 mmol) of pyridine (manufactured by Wako Pure Chemical Industries, Ltd.) and 19.5 g (191 mmol) of acetic anhydride (manufactured by Wako Pure Chemical Industries, Ltd.) were added thereto, and the reaction solution was heated to 80° C. and stirred for 3 hours. The reaction solution was cooled to room temperature, 260 mL of acetone and 20 mL of water were added thereto, and the solution was stirred for 30 minutes. 800 mL of methanol was added thereto over 10 minutes and P-16 was precipitated as white powder. The white powder obtained through suction filtration was repeatedly re-slurry washed four times using 800 mL of methanol, N-methylpyrrolidone was removed such that the proportion thereof was 0.1% or less, and the resultant was dried at 40° C. for 12 hours using an air drier, thereby obtaining 29.8 g (yield: 90%) of P-16.

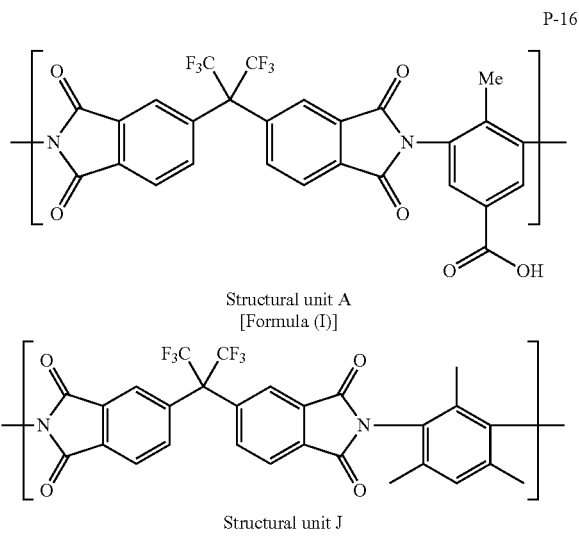

P-16

Structural unit A
[Formula (I)]

Structural unit J
[Formula (II-a)]

Structural unit A: Structural unit J = 80:20 (molar ratio)
Weight average molecular weight: 140000

Further, the structure of cellulose acetate (comparative polymer 01) used in Comparative Examples 5 and 8 and the identification method thereof will be described below.

<Structure Identification of Cellulose Derivative>

In regard to cellulose acetate (L-70 (trade name), degree of substitution: 2.4, manufactured by Daicel Corporation), the kind and the degree of substitution of a substituent group introduced to a hydroxyl group of cellulose were determined by $^1$H-NMR with reference to a method described in Cellulose Communication 6, 73 to 79 (1999) and Chrality 12(9), 670 to 674.

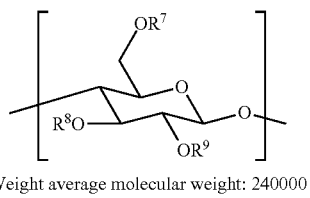

Comparative polymer 01

Weight average molecular weight: 240000

In the comparative polymer 01, $R^7$, $R^8$, and $R^9$ represent a hydrogen atom or an acetyl group.

[Example 1] Preparation of Composite Membrane

<Preparation of PAN Porous Membrane with Smooth Layer>

(Preparation of Radiation-Curable Polymer Having Dialkyl Siloxane Group)

An n-heptane solution containing 39% by mass of commercially available UV 9300 (trade name, manufactured by Momentive Performance Materials Inc.), 10% by mass of commercially available X-22-162C (trade name, manufactured by Shin-Etsu Chemical Co., Ltd.), and 0.01% by mass of DBU (1,8-diazabicyclo[5.4.0]undeca-7-ene) was prepared, and the temperature thereof was maintained at 90° C. during the elapse of 168 hours, thereby obtaining a radiation-curable polymer solution (viscosity at 25° C.: 22.8 mPa·s) including a poly(siloxane) group.

(Preparation of Polymerizable Radiation-Curable Composition)

The above-described radiation-curable polymer solution was cooled to 20° C. and n-heptane was added thereto such that the content thereof became 5% by mass to be diluted. The obtained solution was filtered using filter paper having a filtration accuracy of 2.7 μm and a radiation-curable composition was prepared. 0.1% by mass of UV9380C serving as a photopolymerization initiator (trade name, 45% by mass of bis(4-dodecylphenyl)iodonium=hexafluoroantimonate, manufactured by Momentive Performance Materials Inc., alkyl glycidyl ether solution) and 0.1% by mass of ORGATIX TA-10 (trade name, manufactured by Matsumoto Fine Chemical, Co., Ltd.) were added to the radiation-curable composition, thereby preparing a polymerizable radiation-curable composition.

(Coating of Porous Support with Polymerizable Radiation Curable Composition, Formation of Smooth Layer)

A PAN (polyacrylonitrile) porous membrane (polyacrylonitrile porous membrane present on non-woven fabric, membrane thickness including non-woven fabric: approximately 180 μm) was used as a support, the support was spin-coated with the above-described polymerizable radiation-curable composition, a UV treatment (manufactured by Fusion UV System Inc., Light Hammer 10, D-VALVE (trade name)) was performed thereon under the conditions of a UV intensity of 24 kW/m for a treatment time of 10 seconds, and the support was dried. In this manner, a metal complex and a smooth layer, with a thickness of 600 nm, including a dialkyl siloxane group were formed on the porous support.

<Preparation of Composite Membrane>

1.4 g of the polyimide (P-01) and 8.6 g of methyl ethyl ketone were mixed with each other in a 30 mL brown vial bottle and stirred for 30 minutes, 28 mg of 1-hydroxycyclohexyl phenyl ketone (manufactured by Sigma-Aldrich Japan K.K.) added thereto, and then the mixture was further stirred for 30 minutes. A PAN porous membrane, to which the above-described smooth layer was applied, was allowed to stand still on a clean glass plate having a dimension of 10 cm$^2$ and the polymer solution was cast on the surface of the support membrane using an applicator, thereby obtaining a composite membrane (Example 1). The thickness of the polyimide (P-01) layer was approximately 1 μm and the thickness of the polyacrylonitrile porous film including non-woven fabric was approximately 180 μm.

In addition, the polyacrylonitrile porous membrane having a molecular weight cut-off of 100,000 or less was used. Further, the permeability of the carbon dioxide at 40° C. and 5 MPa was 25000 GPU.

[Examples 2 to 15] Preparation of Composite Membranes

Composite membranes of Examples 2 to 15 listed in Table 1 were prepared by changing the polyimide (P-01) in Example 1 as the description in Table 1.

[Comparative Example 1] Preparation of Composite Membrane

A composite membrane of Comparative Example 1 was prepared by changing the polyimide (P-01) in Example 1 to the comparative polyimide 01.

[Example 16] Preparation of Asymmetric Membrane

After a mixed solution of 2.5 g of methyl ethyl ketone, 2.5 g of N,N-dimethylformamide, and 0.6 g of n-butanol was added to 0.5 g of polyimide (P-01) prepared in the same manner as described above and then dissolved therein, the solution was filtered using a PTFE microfiltration membrane having a pore size of 5.0 μm and the resultant was used as a dope solution. Non-woven fabric (manufactured by Awa Paper Mfg. Co., Ltd., film thickness: 95 μm) made of polyester was placed on a clean glass plate, and the dope solution was deployed in an environment at room temperature (20° C.). After the dope solution was allowed to stand still for 30 seconds, the solution was immersed in a primary coagulating solution (0° C., 75 wt % methanol aqueous solution) for 1 hour and then immersed in a secondary coagulating solution (0° C., 75 wt % methanol aqueous solution) for 1 hour, thereby preparing an asymmetric membrane. The obtained asymmetric membrane was washed with methanol, the methanol was substituted with isooctane, and the membrane was heated at 50° C. for 8 hours and further heated at 110° C. for 6 hours such that the isooctane was evaporated and dried, thereby obtaining an asymmetric membrane (Example 16) in which the thickness of a dense skin layer was 0.1 μm or less and the total membrane thickness of the polyimide layer was 40 μm.

[Example 17] Preparation of Asymmetric Membrane

An asymmetric membrane of Example 17 listed in Table 1 was prepared by changing the polyimide (P-01) in Example 16 described above as the description of Table 1.

[Comparative Example 2] Preparation of Asymmetric Membrane

An asymmetric membrane of Comparative Example 2 was prepared by changing the polyimide (P-01) in Example 16 to the comparative polyimide 01.

[Comparative Example 3] Preparation of Asymmetric Membrane

An asymmetric membrane of Comparative Example 3 was prepared by changing the polyimide (P-01) in Example 16 to the comparative polyimide 02 and drying was performed in a vacuum at 150° C. for 24 hours in order for the comparative polyimide to be ester-crosslinked.

[Test Example 1] Evaluation of Gas Separation Property and $CO_2$ Permeability of Gas Separation Membrane Evaluation was performed on the gas separation membranes of respective Examples and Comparative Examples, which are the obtained thin composite membranes, in the manner described below. Permeation test samples were prepared by cutting the membranes such that the diameter of each porous support became 47 mm. Using a gas permeability measurement device manufactured by GTR Tec Corporation, mixed gas in which the volume ratio of carbon dioxide ($CO_2$) to methane ($CH_4$) was 20:80 was adjusted and supplied such that the total pressure on the gas supply side became 5 MPa (partial pressure of $C_2$: 1 MPa), the flow rate thereof became 500 mL/min, and the temperature thereof became 40° C. The gas that had been passed through was analyzed using gas chromatography. The gas permeabilities of the membranes were compared to each other by calculating gas permeation rates as gas permeability (Permeance). The unit of gas permeability (gas permeation rate) was expressed by the unit of GPU [1 GPU=1×10$^{-6}$ cm$^3$ (STP)/cm$^2$·sec·cmHg]. The gas separation property (that is, separation selectivity) was calculated as the ratio ($R_{CO_2}/R_{CH_4}$) of the permeation rate $R_{CH_4}$ of $CH_4$ to the permeation rate $R_{CO_2}$ of $CO_2$ of the membrane.

[Test Example 2] Toluene Exposure Test

A 100 mL empty beaker was allowed to stand still in a glass container capable of covering a toluene solvent with a stretched lid, slices of the gas separation membranes prepared in Examples and Comparative Examples were put into the beaker, and the glass container was covered with the lid made of glass to obtain a closed system. Thereafter, the closed system was stored under a temperature condition of 40° C. for 5 hours and gas separation performance was evaluated in the same manner as in [Test Example 1] described above. By performing this toluene exposure test, plasticization resistance of a gas separation membrane with respect to impurities such as benzene, toluene, and xylene can be evaluated.

The results of respective Test Examples described above are listed in the following Table 1.

TABLE 1

| | Polymer | Weight average molecular weight | Shape of membrane | $CO_2$ permeation rate (unit: GPU) | Gas separation selectivity ($R_{CO2}/R_{CH4}$) untreated | After toluene exposure |
|---|---|---|---|---|---|---|
| Example 1 | P-01 | 140000 | Composite | 110 | 33 | 29 |
| Example 2 | P-02 | 130000 | Composite | 130 | 28 | 25 |
| Example 3 | P-03 | 120000 | Composite | 135 | 31 | 29 |
| Example 4 | P-04 | 100000 | Composite | 140 | 32 | 30 |
| Example 5 | P-05 | 90000 | Composite | 80 | 38 | 33 |
| Example 6 | P-06 | 80000 | Composite | 70 | 41 | 39 |
| Example 7 | P-07 | 200000 | Composite | 70 | 42 | 38 |
| Example 8 | P-08 | 50000 | Composite | 130 | 30 | 27 |
| Example 9 | P-09 | 70000 | Composite | 120 | 33 | 30 |
| Example 10 | P-10 | 130000 | Composite | 125 | 27 | 25 |
| Example 11 | p-11 | 100000 | Composite | 80 | 32 | 28 |
| Example 12 | P-12 | 60000 | Composite | 180 | 26 | 24 |
| Example 13 | P-13 | 70000 | Composite | 80 | 39 | 34 |
| Example 14 | P-14 | 220000 | Composite | 230 | 25 | 22 |
| Example 15 | P-15 | 120000 | Composite | 80 | 39 | 35 |
| Comparative Example 1 | Comparative polyimide 01 | 150000 | Composite | 65 | 23 | 17 |
| Example 16 | P-01 | 140000 | Asymmetric | 100 | 31 | 27 |
| Example 17 | P-05 | 90000 | Asymmetric | 65 | 36 | 31 |
| Comparative Example 2 | Comparative polyimide 01 | 150000 | Asymmetric | 43 | 21 | 15 |
| Comparative Example 3 | Comparative polyimide 02 | 130000 | Asymmetric | 60 | 22 | 21 |

[Examples 18 to 26] Preparation of Composite Membranes

Composite membranes of Examples 18 to 26 listed in Table 2 were prepared by making the polyimide (P-01) in Example 1 as the description in Table 2.

[Comparative Example 4] Preparation of Composite Membrane

A composite membrane of Comparative Example 4 was prepared by changing the polyimide (P-01) in Example 1 to the comparative polyimide 01.

[Comparative Example 5] Preparation of Composite Membrane

A composite membrane of Comparative Example 5 was prepared by changing the polyimide (P-01) in Example 1 to the comparative polyimide 01.

[Examples 27 and 28] Preparation of Asymmetric Membrane

Asymmetric membranes of Examples 27 and 28 listed in Table 2 were prepared by making the polyimide (P-01) in Example 16 as the description in Table 2

[Comparative Example 6] Preparation of Asymmetric Membrane

An asymmetric membrane of Comparative Example 6 was prepared by changing the polyimide (P-01) in Example 16 to the comparative polyimide 01.

[Comparative Example 7] Preparation of Asymmetric Membrane

An asymmetric membrane of Comparative Example 7 was prepared by changing the polyimide (P-01) in Example 16 to the comparative polyimide 02 and drying was performed in a vacuum at 150° C. for 24 hours in order for the comparative polyimide to be ester-crosslinked.

[Comparative Example 8] Preparation of Asymmetric Membrane

An asymmetric membrane of Comparative Example 8 was prepared by changing the polyimide (P-01) in Example 16 to the comparative polyimide 01.

Further, among Examples 18 to 28 and Comparative Examples 4 to 8, a membrane was prepared using the same method in Example 18 and Example 1, Example 19 and Example 2, Example 20 and Example 4, Example 21 and Example 5, Example 22 and Example 7, Example 23 and Example 10, Example 24 and Example 13, Example 25 and Example 14, Example 27 and Example 16, and Example 28 and Example 17 respectively, and a membrane was prepared using the same method in Comparative Example 4 and Comparative Example 1, Comparative Example 6 and Comparative Example 2, and Comparative Example 7 and Comparative Example 3.

[Test Example 3] Evaluation of Gas Separation Property and $CO_2$ Permeability of Gas Separation Membrane The gas permeability and gas separation performance of a membrane were evaluated by changing the conditions of measuring gas permeability in Test Example 1 described above such that the composition ratio of carbon dioxide ($CO_2$) to methane ($CH_4$) in mixed gas became 5:95, the total pressure on the gas supply side became 5 MPa (partial pressure of $CO_2$: 0.25 MPa), the flow rate thereof became 500 mL/min, and the temperature thereof became 30° C.

[Test Example 4] Evaluation of Gas Separation Property and $CO_2$ Permeability of Gas Separation Membrane The gas permeability and gas separation performance of a membrane were evaluated by changing the conditions of measuring gas permeability in Test Example 1 described above such that the composition ratio of carbon dioxide ($CO_2$) to methane ($CH_4$) in mixed gas became 25:75, the total pressure on the gas supply side became 3 MPa (partial pressure of $CO_2$: 0.75 MPa), the flow rate thereof became 500 mL/min, and the temperature thereof became 50° C.

[Test Example 5] Evaluation of Gas Separation Property and $CO_2$ Permeability of Gas Separation Membrane The gas permeability and gas separation performance of a membrane were evaluated by changing the conditions of measuring gas permeability in Test Example 1 described above such that the composition ratio of carbon dioxide ($CO_2$) to methane ($CH_4$) in mixed gas became 80:20, the total pressure on the gas supply side became 3 MPa (partial pressure of $CO_2$: 2.4 MPa), the flow rate thereof became 500 mL/min, and the temperature thereof became 40° C.

The results of respective Test Examples described above are listed in Table 2.

6, and 7) produced using comparative polyimide which does not include the repeating unit represented by Formula (I) and the gas separation membranes (Comparative Examples 5 and 8) produced using cellulose acetate, the gas permeation rate was poor and the gas separation selectivity was also degraded under a high pressure condition at a temperature of 30° C.

Meanwhile, in the gas separation membranes of the present invention which were produced using polyimides (P-01 to P-16) which include the repeating unit represented by Formula (I), the gas separation rate was high and the gas separation selectivity was excellent under a high pressure condition at a temperature of 30° C. (Examples 18 to 28), and the membranes were suitable as a separation membrane of carbon dioxide and methane.

Similarly, as shown from the results of Test Example 4 of Table 2, in the gas separation membranes of the present invention, the gas separation rate was high and the gas separation selectivity was excellent under a high pressure condition at a temperature of 50° C. (Examples 18 to 28), and the membranes were suitable as a separation membrane of carbon dioxide and methane.

TABLE 2

| | Polymer | Weight average molecular weight | Shape of membrane | $CO_2$ permeability ($Q_{CO_2}$ unit: GPU) | | | Gas separation selectivity ($R_{CO_2}/R_{CH_4}$) | | |
|---|---|---|---|---|---|---|---|---|---|
| | | | | Test Example 3 | Test Example 4 | Test Example 5 | Test Example 3 | Test Example 4 | Test Example 5 |
| Example 18 | P-01 | 140000 | Composite | 80 | 120 | 180 | 38 | 35 | 43 |
| Example 19 | P-02 | 130000 | Composite | 85 | 140 | 210 | 34 | 30 | 36 |
| Example 20 | P-04 | 100000 | Composite | 90 | 145 | 220 | 37 | 33 | 39 |
| Example 21 | P-05 | 90000 | Composite | 60 | 85 | 145 | 42 | 40 | 50 |
| Example 22 | P-07 | 200000 | Composite | 55 | 75 | 130 | 45 | 43 | 55 |
| Example 23 | P-10 | 130000 | Composite | 85 | 135 | 240 | 34 | 29 | 35 |
| Example 24 | P-13 | 70000 | Composite | 60 | 90 | 140 | 44 | 40 | 51 |
| Example 25 | P-14 | 220000 | Composite | 120 | 235 | 350 | 31 | 26 | 30 |
| Example 26 | P-16 | 140000 | Composite | 85 | 145 | 215 | 35 | 30 | 38 |
| Comparative Example 4 | Comparative polyimide 01 | 150000 | Composite | 45 | 65 | 120 | 30 | 25 | 28 |
| Comparative Example 5 | Comparative polymer 01 | 240000 | Composite | 50 | 70 | 128 | 22 | 19 | 21 |
| Example 27 | P-01 | 140000 | Asymmetric | 75 | 110 | 155 | 35 | 33 | 40 |
| Example 28 | P-05 | 90000 | Asymmetric | 55 | 90 | 130 | 40 | 37 | 48 |
| Comparative Example 6 | Comparative polyimide 01 | 150000 | Asymmetric | 30 | 58 | 100 | 28 | 23 | 26 |
| Comparative Example 7 | Comparative polyimide 02 | 130000 | Asymmetric | 43 | 65 | 120 | 29 | 24 | 27 |
| Comparative Example 8 | Comparative polymer 01 | 240000 | Asymmetric | 50 | 70 | 128 | 20 | 18 | 20 |

As shown from the results of Table 1, in the gas separation membranes produced using comparative polyimide which does not include the repeating unit represented by Formula (I), the gas permeation rate was poor and the gas separation selectivity was degraded under a high pressure condition (Comparative Examples 1, 2, and 3).

Meanwhile, in the gas separation membrane produced using polyimides (P-01 to P-15) which include the repeating unit represented by Formula (I), both of a high gas separation rate and excellent gas separation selectivity under a high pressure condition were achieved at a high level (Examples 1 to 17). That is, the gas separation membranes of Examples 1 to 17 had excellent selective permeability of carbon dioxide under a high pressure condition and were suitable as a separation membrane of carbon dioxide and methane. Further, stability in the coexistence of toluene was excellent and performance stabilized for a long period of time was exhibited.

As shown from the results of Test Example 3 in Table 2, in the gas separation membranes (Comparative Examples 4, Further, as shown from the results of Test Example 5 of Table 2, in the gas separation membranes of the present invention, the gas separation rate was high and the gas separation selectivity was excellent under the conditions of a high pressure and a high $CO_2$ partial pressure (Examples 18 to 28), and the membranes were suitable as a separation membrane of carbon dioxide and methane.

As shown from the results described above, when the gas separation membrane of the present invention is used, it is possible to provide an excellent gas separation method, an excellent gas separation module, and an excellent gas separation device including the gas separation module.

EXPLANATION OF REFERENCES

1: gas separation layer
2: porous layer
3: non-woven fabric layer
10, 20: composite gas separation membrane

The present invention has been described with reference to embodiments, but any detailed description of the invention is not intended to be limited unless otherwise specified. The appended claims should be broadly interpreted within the range not departing from the spirit and the scope of the invention.

What is claimed is:

1. A gas separation membrane comprising:
a gas separation layer which is formed to include a polyimide compound,
wherein the polyimide compound includes a repeating unit represented by the following Formula (I), Formula (I)

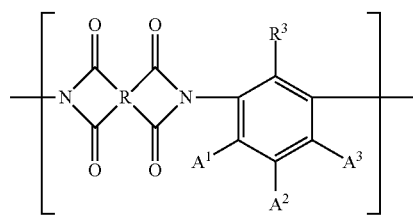

in Formula (I), R represents a group having a structure represented by any of the following Formulae (I-1) to (I-28), $X^1$ to $X^3$ represent a single bond or a divalent linking group, L represents —CH=CH— or —CH$_2$—, $R^1$ and $R^2$ represent a hydrogen atom or a substituent group, and the symbol "*" represents a binding site with respect to a carbonyl group in Formula (I), $R^3$ represents a group selected from a group consisting of an alkyl group, a halogen atom, a carboxy group, a hydroxyl group, an alkylamino group, an arylamino group, an acylamino group, an alkoxy group, an acyloxy group, an alkoxycarbonyl group, an imidazole group, a triazole group, a tetrazole group, a cyano group, a sulfo group, a sulfonamide group, an alkylsulfonyl group, and a mercapto group, $A^1$ to $A^3$ represent a hydrogen atom or a group selected from a group consisting of an alkyl group, a halogen atom, a carboxy group, a hydroxyl group, an alkylamino group, an arylamino group, an acylamino group, an alkoxy group, an acyloxy group, an alkoxycarbonyl group, an imidazole group, a triazole group, a tetrazole group, a cyano group, a sulfonamide group, an alkylsulfonyl group, and a mercapto group, but all of $A^1$ to $A^3$ do not represent a hydrogen atom at the same time, and at least one of $R^3$, $A^1$, $A^2$, and $A^3$ represents a group selected from a group consisting of a carboxy group, a hydroxyl group, an alkylamino group, an acylamino group, an acyloxy group, an alkoxycarbonyl group, an imidazole group, a triazole group, a tetrazole group, a cyano group, a sulfonamide group, an alkylsulfonyl group, and a mercapto group

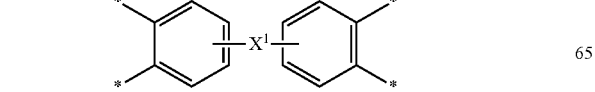
(I-1)

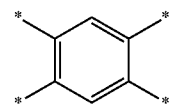
(I-2)

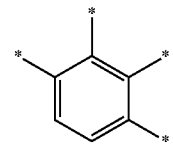
(I-3)

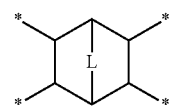
(I-4)

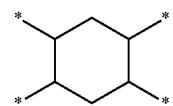
(I-5)

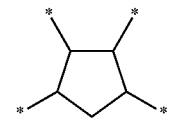
(I-6)

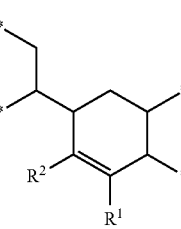
(I-7)

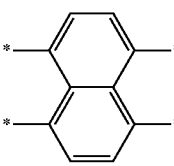
(I-8)

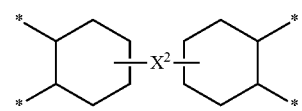
(I-9)

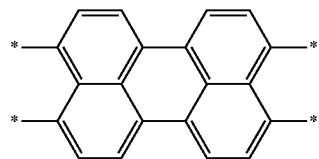
(I-10)

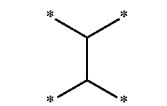
(I-11)

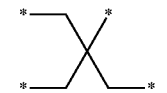
(I-12)

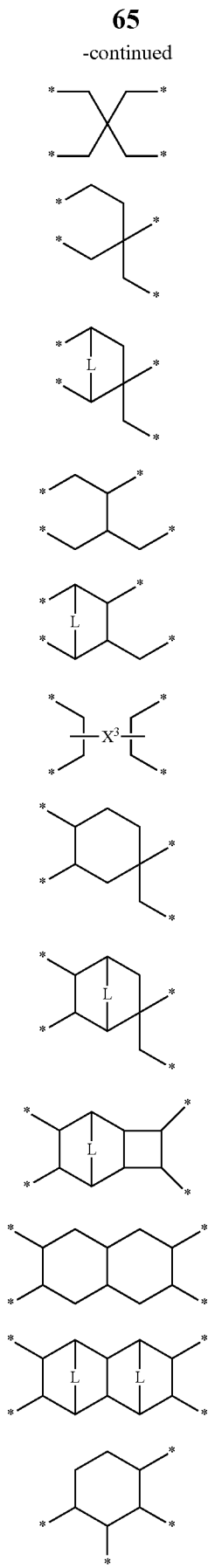

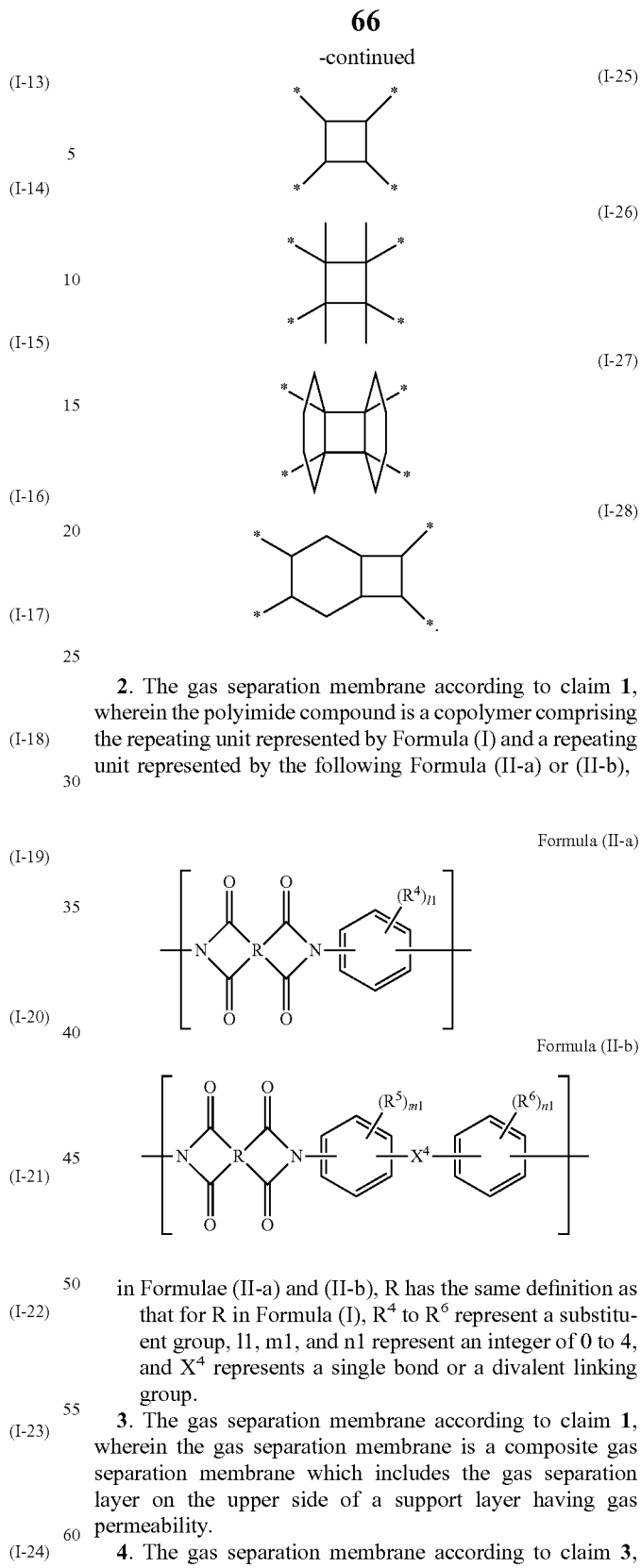

2. The gas separation membrane according to claim 1, wherein the polyimide compound is a copolymer comprising the repeating unit represented by Formula (I) and a repeating unit represented by the following Formula (II-a) or (II-b), in Formulae (II-a) and (II-b), R has the same definition as that for R in Formula (I), $R^4$ to $R^6$ represent a substituent group, l1, m1, and n1 represent an integer of 0 to 4, and $X^4$ represents a single bond or a divalent linking group.

3. The gas separation membrane according to claim 1, wherein the gas separation membrane is a composite gas separation membrane which includes the gas separation layer on the upper side of a support layer having gas permeability.

4. The gas separation membrane according to claim 3, wherein the support layer is formed of a porous layer on a gas separation layer side and a non-woven fabric layer on a side opposite to the gas separation layer.

5. The gas separation membrane according to claim 1, wherein, in a case where gas subjected to a separation treatment is mixed gas of carbon dioxide and methane, the permeation rate of carbon dioxide at 40° C. and 5 MPa is greater than 20 GPU, and the ratio between permeation rates of carbon dioxide and methane ($R_{CO2}/R_{CH4}$) is 15 or greater.

6. The gas separation membrane according to claim 4, wherein the molecular weight cut-off of the porous layer is 100000 or less.

7. The gas separation membrane according to claim 1, which is used to allow selective permeation of carbon dioxide from gas containing carbon dioxide and methane.

8. A gas separation module comprising the gas separation membrane according to claim 1.

9. A gas separation device comprising the gas separation module according to claim 8.

10. A gas separation method comprising:
allowing carbon dioxide to selectively permeate from gas containing carbon dioxide and methane using the gas separation membrane according to claim 1.

11. A gas separation membrane comprising:
a gas separation layer which is formed to include a polyimide compound,
wherein the polyimide compound is a copolymer comprising a repeating unit represented by the following Formula (I) and a repeating unit represented by the following Formula (II-a) or (II-b), Formula (I)

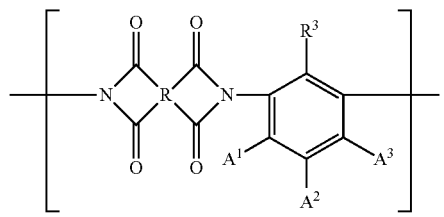

Formula (II-a)

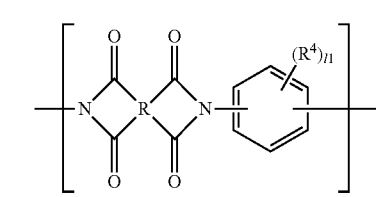

(Formula (II-b))

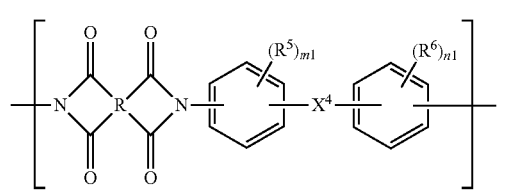

in Formula (I), R represents a group having a structure represented by any of the following Formulae (I-1) to (I-28), $X^1$ to $X^3$ represent a single bond or a divalent linking group, L represents —CH=CH— or —CH$_2$—, $R^1$ and $R^2$ represent a hydrogen atom or a substituent group, and the symbol "*" represents a binding site with respect to a carbonyl group in Formula (I), $R^3$ represents a group selected from a group consisting of an alkyl group, a halogen atom, a carboxy group, a hydroxyl group, an alkylamino group, an arylamino group, an acylamino group, an alkoxy group, an acyloxy group, an alkoxycarbonyl group, an imidazole group, a triazole group, a tetrazole group, a cyano group, a sulfo group, a sulfonamide group, an alkylsulfonyl group, and a mercapto group, $A^1$ to $A^3$ represent a hydrogen atom or a group selected from a group consisting of an alkyl group, a halogen atom, a carboxy group, a hydroxyl group, an alkylamino group, an arylamino group, an acylamino group, an alkoxy group, an acyloxy group, an alkoxycarbonyl group, an imidazole group, a triazole group, a tetrazole group, a cyano group, a sulfonamide group, an alkylsulfonyl group, and a mercapto group, but all of $A^1$ to $A^3$ do not represent a hydrogen atom at the same time, and at least one of $R^3$, $A^1$, $A^2$, and $A^3$ represents a group selected from a group consisting of a carboxy group, a hydroxyl group, an alkylamino group, an acylamino group, an alkoxy group, an acyloxy group, an alkoxycarbonyl group, an imidazole group, a triazole group, a tetrazole group, a cyano group, a sulfonamide group, an alkylsulfonyl group, and a mercapto group (I-1)
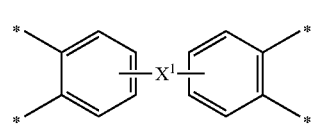

(I-2)
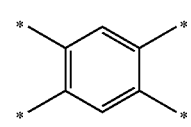

(I-3)
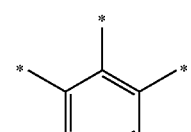

(I-4)
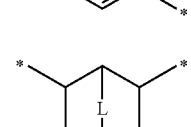

(I-5)
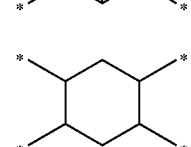

(I-6)
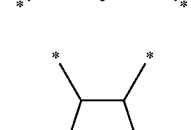

(I-7)
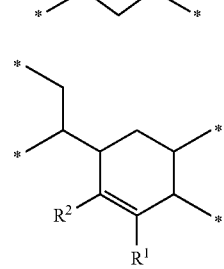

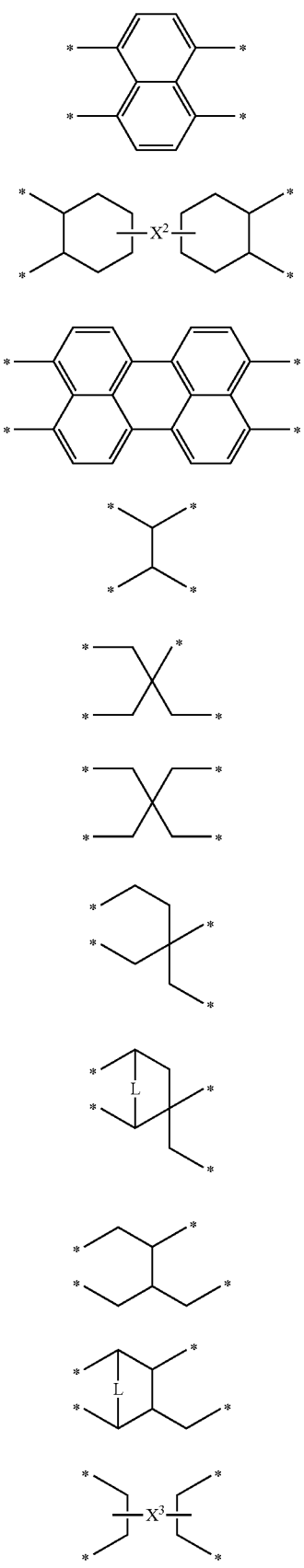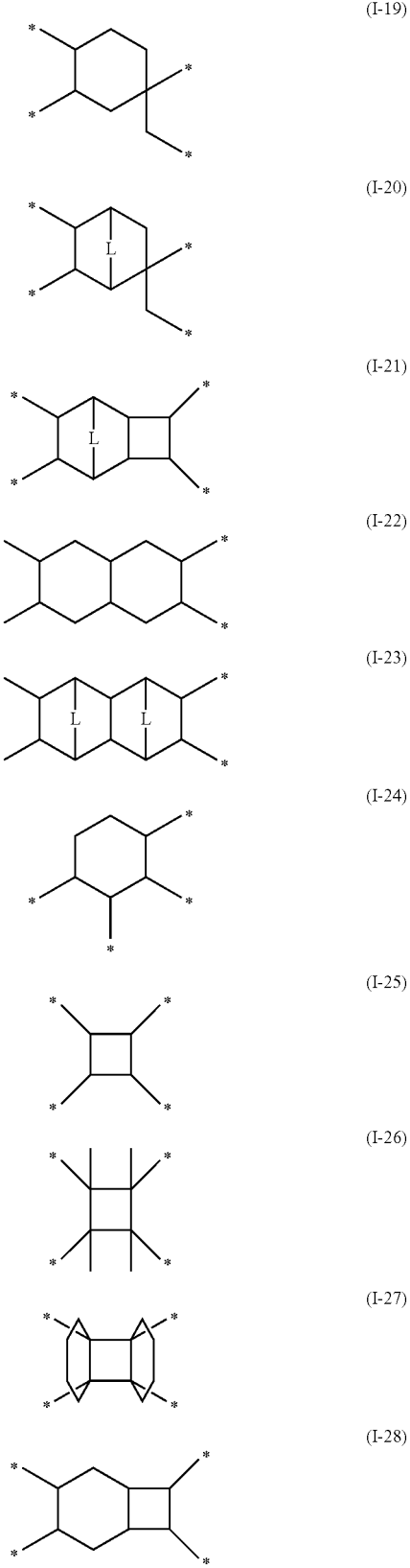
in Formulae (II-a) and (II-b), R has the same definition as that for R in Formula (I), $R^4$ to $R^6$ represent a substituent group, l1, m1, and n1 represent an integer of 0 to 4, and $X^4$ represents a single bond or a divalent linking group.

12. The gas separation membrane according to claim 11, wherein the gas separation membrane is a composite gas separation membrane which includes the gas separation layer on the upper side of a support layer having gas permeability.

13. The gas separation membrane according to claim 12, wherein the support layer is formed of a porous layer on a gas separation layer side and a non-woven fabric layer on a side opposite to the gas separation layer.

14. The gas separation membrane according to claim 11, wherein, in a case where gas subjected to a separation treatment is mixed gas of carbon dioxide and methane, the permeation rate of carbon dioxide at 40° C. and 5 MPa is greater than 20 GPU, and the ratio between permeation rates of carbon dioxide and methane ($R_{CO2}/R_{CH4}$) is 15 or greater.

15. The gas separation membrane according to claim 13, wherein the molecular weight cut-off of the porous layer is 100000 or less.

16. The gas separation membrane according to claim 11, which is used to allow selective permeation of carbon dioxide from gas containing carbon dioxide and methane.

17. A gas separation module comprising the gas separation membrane according to claim 11.

18. A gas separation device comprising the gas separation module according to claim 17.

19. A gas separation method comprising:
allowing carbon dioxide to selectively permeate from gas containing carbon dioxide and methane using the gas separation membrane according to claim 11.

* * * * *